US011290943B2

United States Patent
Kedalagudde et al.

(10) Patent No.: US 11,290,943 B2
(45) Date of Patent: Mar. 29, 2022

(54) ACCESS CONTROL FOR USER EQUIPMENT WITH COVERAGE ENHANCEMENT LEVEL SUPPORT

(71) Applicant: Apple Inc., Cupertino, CA (US)

(72) Inventors: Meghashree Dattatri Kedalagudde, Portland, OR (US); Puneet Jain, Hillsboro, OR (US); Bharat Shrestha, Hillsboro, OR (US); Marta Martinez Tarradell, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 16/609,312

(22) PCT Filed: Jun. 22, 2018

(86) PCT No.: PCT/US2018/039042
§ 371 (c)(1),
(2) Date: Oct. 29, 2019

(87) PCT Pub. No.: WO2018/237289
PCT Pub. Date: Dec. 27, 2018

(65) Prior Publication Data
US 2021/0337458 A1  Oct. 28, 2021

Related U.S. Application Data

(60) Provisional application No. 62/523,384, filed on Jun. 22, 2017.

(51) Int. Cl.
*H04W 4/00* (2018.01)
*H04W 48/04* (2009.01)
(Continued)

(52) U.S. Cl.
CPC ............. *H04W 48/04* (2013.01); *H04W 4/70* (2018.02); *H04W 4/80* (2018.02); *H04W 24/10* (2013.01); *H04W 48/06* (2013.01)

(58) Field of Classification Search
CPC ......... H04W 48/04; H04W 4/70; H04W 4/80; H04W 24/10; H04W 48/06
(Continued)

(56) References Cited

U.S. PATENT DOCUMENTS 10,075,953 B2   9/2018  Jha
10,694,448 B2   6/2020  Koskinen
(Continued)

FOREIGN PATENT DOCUMENTS

CN     102892145 A     1/2013
EP     3101980 A1     12/2016
(Continued)

OTHER PUBLICATIONS

International Preliminary Report on Patentability dated Dec. 24, 2019 for International Application No. PCT/US2018/039042.
(Continued)

*Primary Examiner* — Mark G. Pannell
(74) *Attorney, Agent, or Firm* — Eschweiler & Potashnik, LLC

(57) ABSTRACT

The techniques, described herein, may enable a wireless telecommunication network to manage Mobility Management Entity (MME) overload scenarios by causing a Radio Access Network (RAN) node to temporarily bar certain User Equipment (UEs) from connecting to the RAN node. In some embodiments, UEs may be barred from connecting to the RAN node based on which UEs are operating in an enhanced coverage mode, Coverage Enhancement (CE) levels of each UE, and/or a measured Reference Signal Received Power (RSRP) of each UE.

24 Claims, 12 Drawing Sheets

(51) Int. Cl.
*H04W 4/70* (2018.01)
*H04W 4/80* (2018.01)
*H04W 24/10* (2009.01)
*H04W 48/06* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2012/0115485 | A1* | 5/2012 | Narasimha | H04W 68/02 455/437 |
| 2015/0016312 | A1* | 1/2015 | Li | H04W 74/006 370/280 |
| 2015/0043445 | A1* | 2/2015 | Xiong | H04L 5/006 370/329 |
| 2015/0181575 | A1* | 6/2015 | Ng | H04W 72/042 370/329 |
| 2017/0026863 | A1* | 1/2017 | Wang | H04W 4/70 |
| 2017/0135025 | A1 | 5/2017 | Koskinen et al. | |
| 2017/0318478 | A1* | 11/2017 | Basu Mallick | H04L 5/0069 |
| 2018/0324866 | A1* | 11/2018 | Lee | H04W 76/27 |
| 2019/0110241 | A1* | 4/2019 | Jain | H04W 24/02 |
| 2021/0112597 | A1* | 4/2021 | Sharma | H04W 48/02 |

FOREIGN PATENT DOCUMENTS

| | | | |
|---|---|---|---|
| WO | 2016/171445 | A1 | 10/2016 |
| WO | 2018/028636 | A1 | 2/2018 |

OTHER PUBLICATIONS

Ericsson; "NB-IoT—Paging"; 3GPP TSG-RAN Wg1 Meeting #84; St. Julian's, Malta, Feb. 15-19, 2016; R1-160270.
Ericsson; "Access control for NB-IoT"; 3GPP TSG-RAN WG2 Meeting NB-IOT ad-hoc; Budapest, Hungary, Jan. 19-21, 2016; R2-160478.
Nokia Networks; "Random access procedure for enhanced coverage UEs"; 3GPP TSG-RAN WG2 Meeting #92; Anaheim, USA; Nov. 16-20, 2015; R2-156445.
International Search Report dated Sep. 13, 2018 for International Application No. PCT/US2018/039042.
"Coverage Enhancement Targets." Source: Alcatel-Lucent, Alcatel-Lucent Shanghai Bell. Agenda Item: 6.3.1.1.1. 3GPP TSG RAN WG1 Meeting #79, San Francisco, USA Nov. 17-21, 2014. R1-144695.
Ericsson, Qualcomm; "New WID on Even further enhanced MTC for LTE"; 3GPP TSG RAN Meeting #75; RP-170732; Mar. 6, 2017.
Huawei, HiSilicon, Neul; "New WID on Further NB-IoT enhancements"; #3GPP TSG RAN Meeting #75; RP-170852; Mar. 6, 2017.
LTE; Evolved Universal Terrestrial Radio Access (E-UTRA); Multiplexing and channel coding (3GPP TS 36.212 version 14.2.0 Release 14); Apr. 2017.
LTE; Evolved Universal Terrestrial Radio Access (E-UTRA); Radio Resource Control (RRC); Protocol specification (3GPP TS 36.331 version 14.2.2 Release 14); May 2017.
LTE; Evolved Universal Terrestrial Radio; Access Network (E-UTRAN); S1 Application Protocol (S1AP) (3GPP TS 36.413 version 14.2.0 Release 14); Apr. 2017.

3rd Generation Partnership Project; Technical Specification Group Radio Access Network; Evolved Universal Terrestrial Radio Access (E-UTRA); Multiplexing and channel coding; (Release 13); 3GPP TS 36.212 V13.6.0; Jun. 2017.
3rd Generation Partnership Project; Technical Specification Group Radio Access Network; Evolved Universal Terrestrial Radio Access (E-UTRA); Multiplexing and channel coding (Release 14); 3GPP TS 36.212 V14.3.0; Jun. 2017.
3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13); 3GPP TS 36.300 V13.8.0; Jun. 2017.
3rd Generation Partnership Project; Technical Specification Group Radio Access Network; Evolved Universal Terrestrial Radio Access (E-UTRA) and Evolved Universal Terrestrial Radio Access Network (E-UTRAN);Overall description; Stage 2 (Release 14); 3GPP TS 36.300 V14.3.0; Jun. 2017.
3rd Generation Partnership Project; Technical Specification Group Radio Access Network; Evolved Universal Terrestrial Radio Access (E-UTRA); Radio Resource Control (RRC); Protocol specification (Release 12); 3GPP TS 36.331 V12.14.0; Jun. 2017.
3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331 V13.6.0; Jun. 2017.
3rd Generation Partnership Project; Technical Specification Group Radio Access Network; Evolved Universal Terrestrial Radio Access (E-UTRA); Radio Resource Control (RRC); Protocol specification (Release 14); 3GPP TS 36.331 V14.3.0; Jun. 2017.
3rd Generation Partnership Project; Technical Specification Group Radio Access Network; Evolved Universal Terrestrial Radio Access Network (E-UTRAN); S1 Application Protocol (S1AP) (Release 13); 3GPP TS 36.413 V13.6.0; Jun. 2017.
3rd Generation Partnership Project; Technical Specification Group Radio Access Network; Evolved Universal Terrestrial Radio Access Network (E-UTRAN); S1 Application Protocol (S1AP) (Release 14); 3GPP TS 36.413 V14.3.0; Jun. 2017.
LTE; Evolved Universal Terrestrial Radio Access (E-UTRA); Multiplexing and channel coding; (3GPP TS 36.212 version 13.5.0 Release 13; ETSI TS 136 212 V13.5.0; Apr. 2017.
LTE; Evolved Universal Terrestrial Radio Access (E-UTRA) and Evolved Universal Terrestrial Radio Access Network (E-UTRAN); Overall description; Stage 2; (3GPP TS 36.300 version 13.7.0 Release 13); ETSI TS 136 300 V13.7.0; Apr. 2017.
LTE; Evolved Universal Terrestrial Radio Access (E-UTRA) and Evolved Universal Terrestrial Radio Access Network (EUTRAN); Overall description; Stage 2; (3GPP TS 36.300 version 14.2.0 Release 14); ETSI TS 136 300 V14.2.0; Apr. 2017.
LTE; Evolved Universal Terrestrial Radio Access (E-UTRA); Radio Resource Control (RRC); Protocol specification (3GPP TS 36.331 version 12.13.0 Release 12); ETSI TS 136 331 V12.13.0; Apr. 2017.
LTE; Evolved Universal Terrestrial Radio Access (E-UTRA); Radio Resource Control (RRC); Protocol specification (3GPP TS 36.331 version 13.5.0 Release 13); ETSI TS 136 331 V13.5.0; Apr. 2017.
LTE; Evolved Universal Terrestrial Radio Access Network (E-Utran); S1 Application Protocol (S1AP); (3GPP TS 36.413 version 13.5.0 Release 13); ETSI TS 136 413 v13.5.0; Jan. 2017.

* cited by examiner

ACCESS CONTROL FOR USER EQUIPMENT WITH COVERAGE ENHANCEMENT LEVEL SUPPORT

RELATED APPLICATIONS

This application is a National Phase entry application of International Patent Application No. PCT/US2018/039042 filed Jun. 22, 2018, which claims priority to U.S. Provisional Patent Application No. 62/523,384, which was filed on Jun. 22, 2017 and is hereby incorporated by reference in its entirety.

BACKGROUND

Wireless telecommunication networks may include User Equipment (UE) (e.g., smartphones, tablet computers, laptop computers, etc.) Radio Access Networks (RANs) (that often include one or more base stations), and a core network. A UE may connect to the core network by communicating with a base station and registering with the core network. Communications between the UE and the base station may occur over one or more wireless channels established between the UE and the base station.

In some scenarios, a wireless telecommunication network may provide Coverage Enhancement (CE) for certain UEs within the network. A UE with CE may be permitted to perform a greater number of retransmissions when attempting to contact a RAN. As such, providing CE to a UE may help ensure that the UE is able to successfully communicate with the network, which may be particularly beneficial to UEs in poor coverage areas within the RAN.

BRIEF DESCRIPTION OF THE DRAWINGS

Embodiments described herein will be readily understood by the following detailed description in conjunction with the accompanying drawings. To facilitate this description, like reference numerals may designate like structural elements. Embodiments are illustrated by way of example and not by way of limitation in the figures of the accompanying drawings.

DETAILED DESCRIPTION OF PREFERRED EMBODIMENTS

Figure 1:
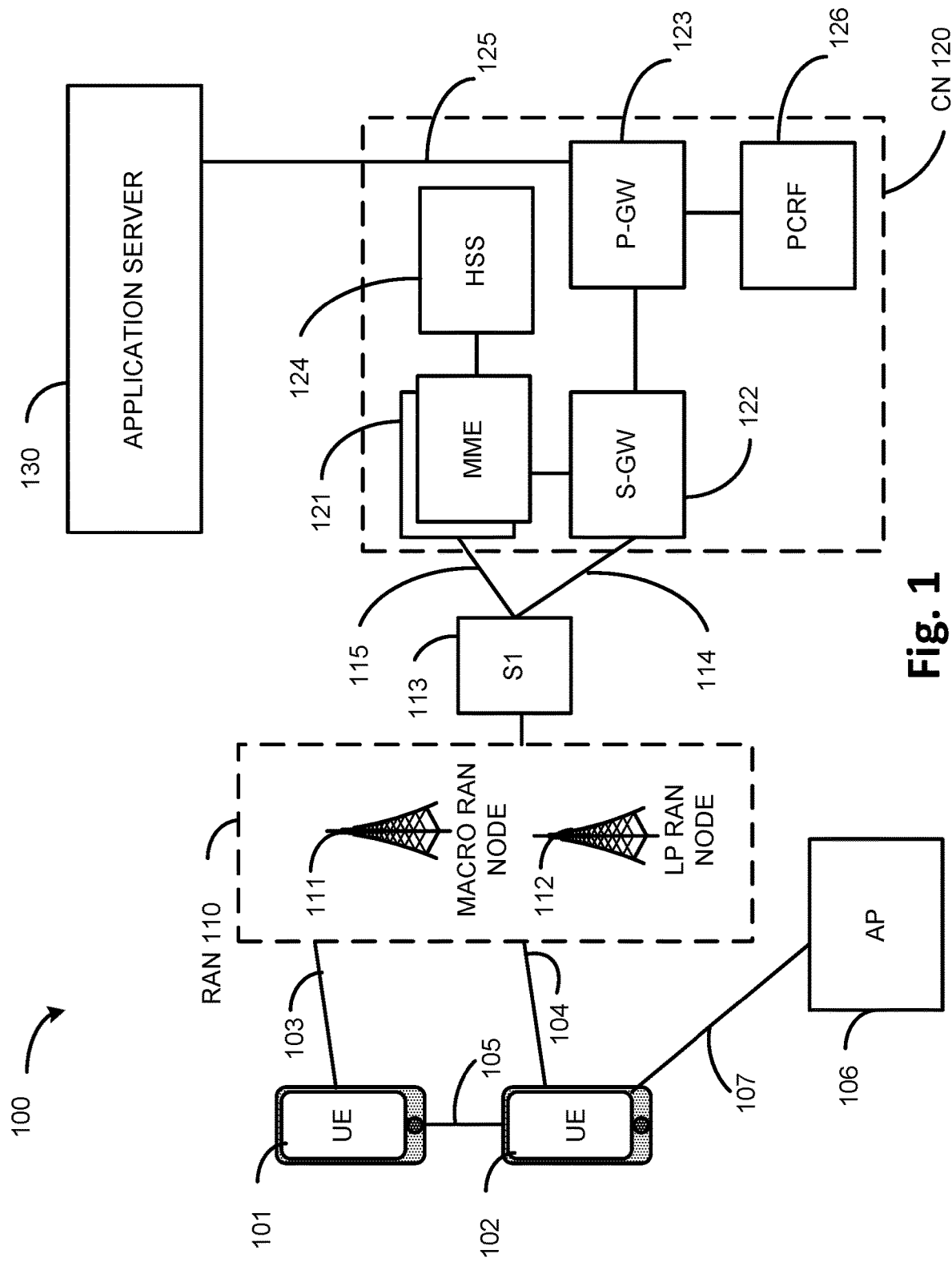
FIG. 1 illustrates an architecture of a system of a network in accordance with some embodiments.

The following detailed description refers to the accompanying drawings. The same reference numbers in different drawings may identify the same or similar elements. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The techniques, described herein, may enable a wireless telecommunication network to manage Mobility Management Entity (MME) overload scenarios by causing a Radio Access Network (RAN) node to temporarily bar certain User Equipment (UEs) from connecting to the RAN node. In some embodiments, UEs may be barred from connecting to the RAN node based on which UEs are operating in an enhanced coverage mode, CE levels of each UE, and/or a measured RSRP of each UE. UEs operating in an enhanced coverage mode are also referred to herein as implementing Coverage Enhancement (CE).

Coverage Enhancement (CE) may include a technique, implemented by a wireless telecommunication network, to better enable UEs to communicate with RAN nodes (e.g., to perform Random Access Procedure (RACH) procedures) by increasing a number of repetitions that the UE may use to communicate with RAN nodes. CE may include two modes (e.g., CE mode A and CE mode B) and four levels (e.g., 0-3). CE levels 0 and 1 may correspond to CE mode A, which may be for moderate signaling enhancement, while CE levels 2 and 3 may correspond to CE mode B, which may be for more extreme signaling enhancement. A CE level may be determined based on a Reference Signal Received Power (RSRP) measured by the UE. Generally, weaker RSRP measurements may result in higher CE levels, meaning a greater number of retransmissions being available to a UE, while stronger RSRP measurements may result in lower CE levels, meaning fewer number retransmissions being available to a UE. In short, a UE may have a CE level commensurate with a difficulty that the UE may experience in communicating with the RAN to establish a connection.

While implementing CE may help ensure effective communications between a UE and a RAN node, the UE using CE may be a greater burden on the MME to which the UE is registered. For example, the MME may use an extended Non-Access Stratum (NAS) timer for UEs operating in enhanced coverage mode. As a result, UEs using CE may have a more significant contribution to an MME becoming overloaded. An MME being overloaded may include the MME experiencing a level of activity that exceeds a threshold of activity and/or that is otherwise beyond a level of activity deemed acceptable for the MME. The level of activity may include a variety of conditions and/or factors, including a number of UEs registered with the MME, a number of UEs in an enhanced coverage mode, a number of active connections between UEs and the network, etc.

The techniques, described herein, may enable MMEs to implement overload start and stop procedures to control MME overload within a wireless telecommunication network. For example, an MME may determine if/when the MME is overloaded, determine CE levels for which UEs are to be blocked from establishing connections with a corresponding RAN node, and communicating instructions to the RAN node about blocking UEs based on the determined CE levels. In response to the instructions, the RAN node may bar, block, ignore, reject, etc., subsequent connection requests from UEs operating at the CE levels indicated by the MME. Additionally, or alternatively, the RAN node may provide UEs with system information to enable the UEs to determine whether they are being blocked. For example, system information broadcasted by the RAN node may include RSRP thresholds by which each UE may measure a RSRP and determine a corresponding CE level for the UE. As such, when the RAN node provides system information indicating CE levels that are blocked from accessing the RAN node, each UE may compare their CE level with the CE levels to be blocked to determine whether the UE is being blocked. In some embodiments, system information may also include a duration for which UEs are blocked, such that UEs may not attempt to connect with the RAN node for at least that duration. Later, the MME may determine that the MME is no longer overloaded and may inform the RAN node to resume normal operating procedures (e.g., so that the UEs previously barred from the RAN node may now access the RAN node). In some embodiments, the RAN node may respond by discontinuing the blocking of connection requests from UEs at the previously blocked CE levels and/or broadcasting updated system information, indicating that CE levels or no longer being blocked. In some embodiments, the RAN node may use paging messages to prompt blocked UEs to obtain updated system information (which may indicate that UEs operating and previously blocked CE levels are no longer being blocked).

FIG. 1 illustrates an architecture of a system 100 of a network in accordance with some embodiments. The system 100 is shown to include UE 101 and a UE 102. The UEs 101 and 102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE or Narrowband (NB-IoT) UE, which can comprise a network access layer designed for low-power IoT applications utilizing short-lived UE connections. An IoT UE can utilize technologies such as machine-to-machine (M2M), machine-type communications (MTC), enhanced MTC, for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, eNBs, next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

The quantity of devices and/or networks, illustrated in FIG. 1, is provided for explanatory purposes only. In practice, system 100 may include additional devices and/or networks; fewer devices and/or networks; different devices and/or networks; or differently arranged devices and/or networks than illustrated in FIG. 1. For example, while not shown, environment 100 may include devices that facilitate or enable communication between various components shown in environment 100, such as routers, modems, gateways, switches, hubs, etc. Alternatively, or additionally, one or more of the devices of system 100 may perform one or more functions described as being performed by another one or more of the devices of system 100. Additionally, the devices of system 100 may interconnect with each other and/or other devices via wired connections, wireless connections, or a combination of wired and wireless connections. In some embodiments, one or more devices of system 100 may be physically integrated in, and/or may be physically attached to, one or more other devices of system 100. Also, while "direct" connections may be shown between certain devices in FIG. 1, some of said devices may, in practice, communicate with each other via one or more additional devices and/or networks.

Figure 2:
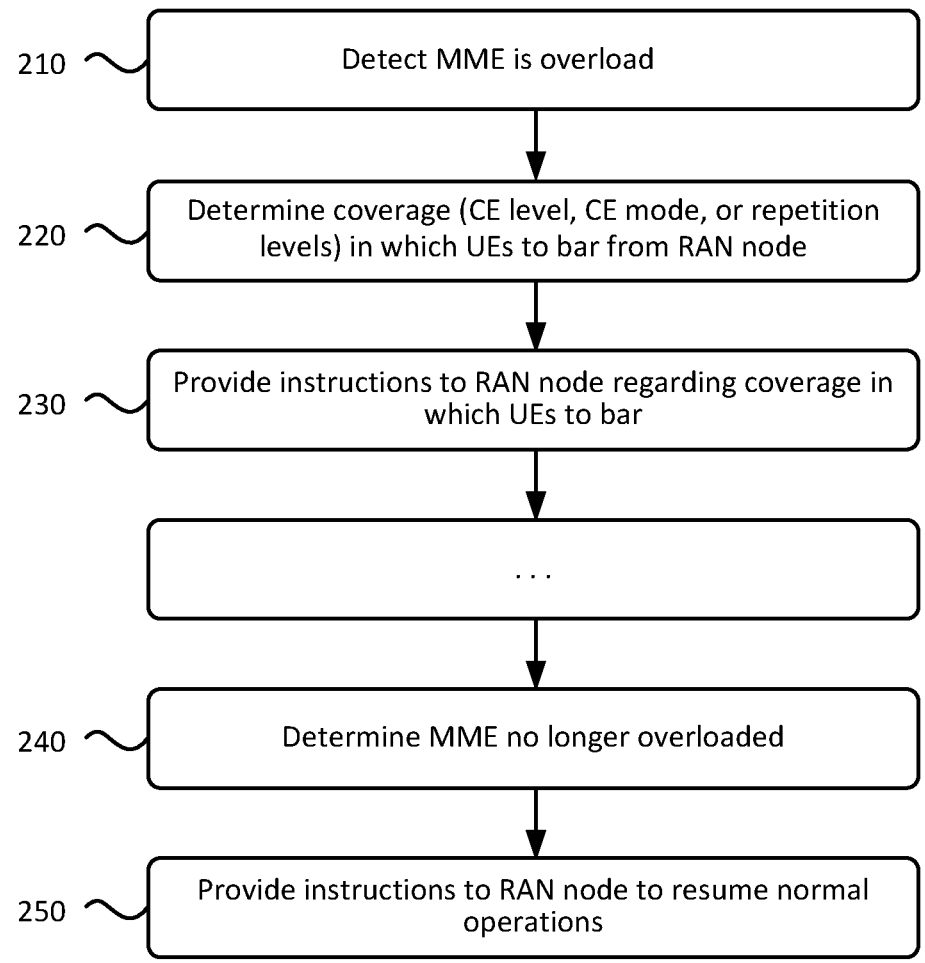
FIG. 2 is a flowchart diagram of an example process for controlling network access for User Equipment (UEs) with Coverage Enhancement (CE) level support.

FIG. 2 is a flowchart diagram of an example process 200 for controlling network access for UEs with CE level support. Process 200 may be implemented by MME 121. In some embodiments, one or more of the operations described in FIG. 2 may be performed in whole, or in part, by another device described above with reference to FIG. 1.

As shown, process 200 may include detecting that MME 121 is overloaded (block 210). For example, MME 121 may monitor one or more functions, operations, processes, etc., to determine a current load state of MME 121. In some embodiments, this may include monitoring a number of UEs 101 registered with MME 121, a level of activity associated with UEs 101 registered with MME 121, a number of UEs 101 that are registered with MME 121 and operating in an enhanced coverage mode, etc. Additionally, or alternatively, MME 121 may apply one or more rules and/or thresholds to the current load state of MME 121 to determine whether MME 121 is overloaded. For example, MME 121 may determine that MME 121 is overloaded upon determining that a current load state of MME 121 exceeds a load state threshold. In some embodiments, MME 121 may also apply one or more rules to analyze the current load state of MME 121 and to determine, for example, a degree to which MME 121 is overloaded, reasons for which MME 121 is overloaded (e.g., which UEs, and/or CE levels of UEs, are contributing to the overloaded state), etc.

Process 200 may also include determining the coverage (CE levels, CE modes, or repetition levels) in which UEs 101 to be bar from RAN node 111 (block 220). For example, in response to determining that MME 121 is overloaded, MME 121 may determine the coverage levels (e.g., CE levels, CE modes, or repetition levels) in which to block UEs 101 from connecting (and/or reconnecting) with RAN node 111. In some embodiments, MME 121 may determine to bar any and all CE levels, CE modes, and/or repetition levels. In some embodiments, MME 121 may determine to bar only one or some CE levels, CE modes, and/or repetition levels.

Process 200 may also include providing instruction to RAN node 111 regarding the coverage (CE levels, CE modes, or repetition levels) in which UEs 101 are to be barred (block 230). For example, MME 121 may generate instructions for baring UEs 101 of certain CE levels, CE modes, and/or repetition levels and may transmit the instructions to RAN node 111. In some embodiments, MME 121 may use an overload start message to provide the instructions to RAN node 111. Additionally, or alternatively, MME 121 may use one or more Information Elements (IE) to provide the instructions. Table 1, below, includes an example of an overload start message IE that may be used by MME 121 to provide instructions to RAN node 111 about which UEs 101 to block.

TABLE 1

Overload Start Message Information Element (IE)

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Overload Response | M | | 9.2.3.19 | | YES | reject |
| GUMMEI List | | 0 ... 1 | | | YES | ignore |
| >GUMMEI List Item | | 1 ... <maxnoofMMECs> | | | EACH | ignore |
| >>GUMMEI | M | | 9.2.3.9 | | — | |
| Traffic Load Reduction Indication | O | | 9.2.3.36 | | YES | ignore |

Another example of an IE that may be used by MME 121 to provide RAN node 111 with instructions is provided below in Table 2, which includes an example of an overload start message IE. The example of Table 2 may be used with, or in place of, one or more of the other IEs described herein.

TABLE 2

Overload Response Information Element (IE)

| IE/Group Name | Presence | Range | IE type and reference | Semantics description |
|---|---|---|---|---|
| CHOICE Overload Response | M | | | |
| >Overload Action | | | | |
| >>Overload Action | M | | 9.2.3.20 | |

Yet another example of an IE that may be used by MME 121 to provide RAN node 111 with instructions is provided below in Table 3, which includes an example of an overload action IE. The example of Table 3 may be used with, or in place of, one or more of the other IEs described herein.

TABLE 3

Overload Action Information Element (IE)

| IE/Group Name | Presence | Range | IE type and reference | Semantics description |
|---|---|---|---|---|
| Overload Action | M | | ENUMERATED (Reject RRC connection establishments for non-emergency MO DT, Reject RRC connection establishments for Signalling, Permit Emergency Sessions and mobile terminated services only, . . . , Permit High Priority Sessions and mobile terminated services only, reject delay tolerant access, not accept mo-data or delay tolerant access from CP CIoT, Reject RRC connection request for data transmission from UE s with CE support) | |
| >OverloadCElevel | O | | BIT STRING (SIZE(16)) CE_Level_All CE_Level_0 CE_Level_1 CE_Level_2 CE_Level_3 CE_Level_0_1 CE_Level_2_3 And so on . . . (all combinations) | |

As noted above, an overload action IE may include an instruction to reject RRC connection requests for data transmission from UEs with CE support and/or an indication of UEs 101, using one or more CE levels, to be block.

Process 200 may also include determining that MME 121 is no longer overloaded (block 240). For example, after providing RAN node 111 with instruction to block UEs 101 at certain CE levels, MME 121 may continue to monitor a load state of MME 121 to determine when MME 121 is no longer overloaded. Determining that MME 121 is no longer overloaded may include one or more operations that are similar to the manner in which MME 121 determined that MME 121 was overloaded. Examples of such operations may include monitoring a number of UEs 101 registered with MME 121, monitoring a number of UEs 101 operating in a CE mode, monitoring a level of MME activity relating to one or more UEs 101 registered with MME 121, etc., in addition to comparing such information to one or more load state thresholds.

As shown, process 200 may also include providing instruction to RAN node 111 to resume normal operations (block 250). For example, upon determining that MME 121 is no longer overloaded, MME 121 may generated and communicate an indication, instructions, etc., for RAN node 111 to resume normal operating condition by, for example, stop blocking UEs 101 of certain CE levels from establishing (and/or reestablishing) connections with RAN node 111. In some embodiments, MME 121 may provide this information using one or more types of messages and/or IEs. Table 4, below, includes an example an overload stop message IE that may be used by MME 121 to cause RAN node 111 to resume normal operating conditions.

TABLE 4

Overload Stop Message Information Element (IE)

| IE/Group Name | Presence | Range | IE type and reference | Semantics description | Criticality | Assigned Criticality |
|---|---|---|---|---|---|---|
| Message Type | M | | 9.2.1.1 | | YES | reject |
| GUMMEI List | | 0 . . . 1 | | | YES | ignore |
| >GUMMEI List Item | | 1 . . . <maxnoofMMECs> | | | EACH | ignore |
| >>GUMMEI | M | | 9.2.3.9 | | — | |
| Overload Stop Cause | O | | ENUMERATED Resume RRC connection request for data transmission from UE s with CE support | | | |
| >OverloadCElevel | C | | BIT STRING (SIZE(16)) CE_Level_All CE_Level_0 | | | |

TABLE 4-continued

Overload Stop Message Information Element (IE)

| IE/Group Name | Presence | Range | IE type and reference | Semantics description | Criticality | Assigned Criticality |
|---|---|---|---|---|---|---|
| | | | CE_Level_1 CE_Level_2 CE_Level_3 CE_Level_0_1 CE_Level_2_3 . . . so on (all combinations) | | | |

As noted above, an overload stop message IE may include an instruction to resume accepting and/or responding to RRC connection requests from UEs 101 of previously blocked CE levels and/or to notify UEs 101 of previously blocked CE levels 101 that such UEs 101 are no longer blocked. In some embodiments, the overload stop message IE may indicate that RAN node 111 is to resume normal operating conditions with respect to all CE levels that were previously blocked, while in other embodiments, the overload stop message IE may indicate that only certain CE levels that were previously blocked should no longer be blocked (such that other CE levels previously identified by instructions from MME 121 may continue to be blocked).

Figure 3:
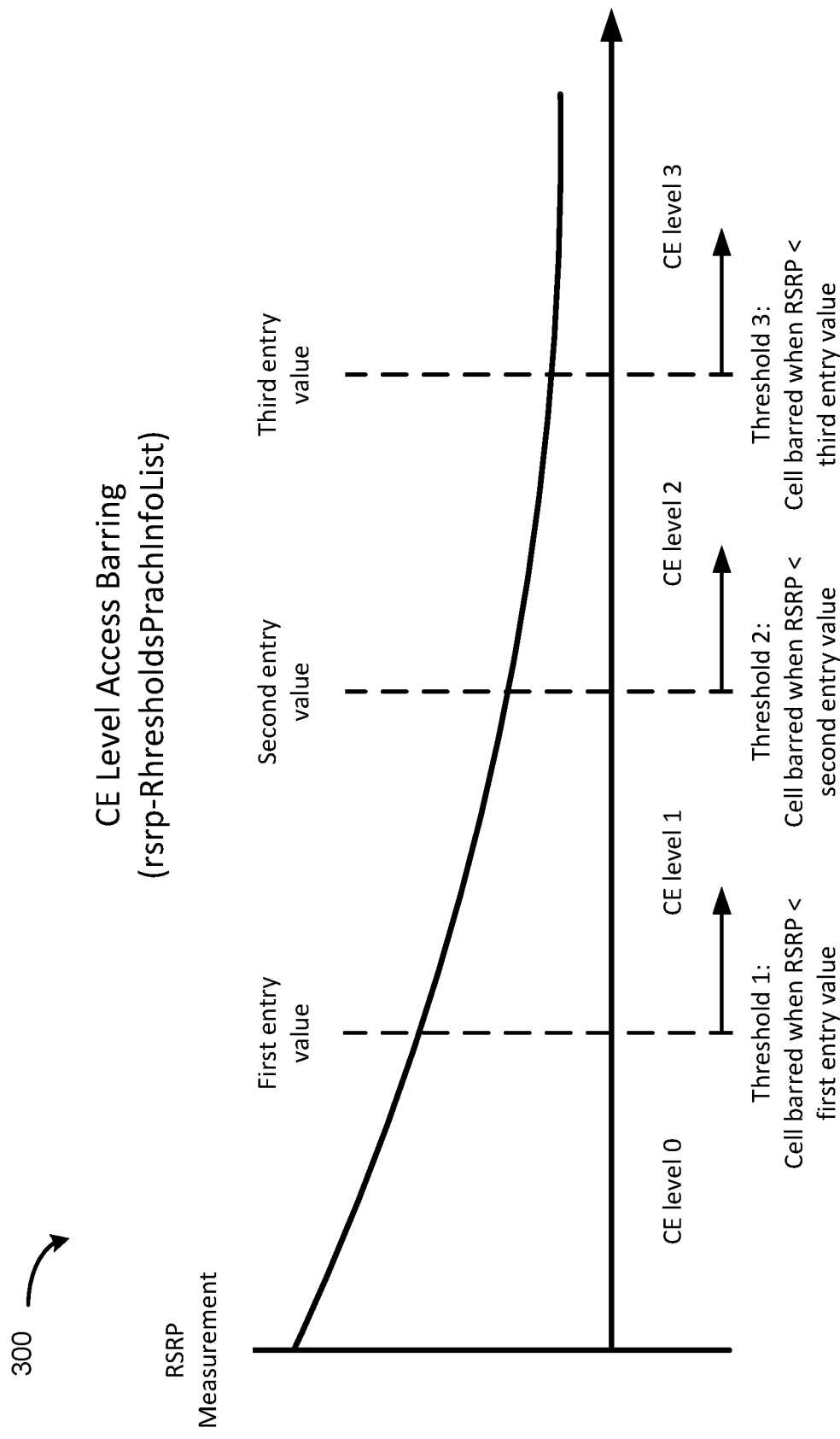
FIG. 3 is a table of an example of controlling network access for UEs with different CE levels.

FIG. 3 is a diagram of an example table 300 of controlling network access for UEs with different CE levels. As shown, example table 300 may include RSRP measurement on a vertical axis and CE levels on a horizontal axis. Additionally, each change in CE level (e.g., CE level 0 to CE level 1, etc.) may include a corresponding entry value (e.g., a first entry value between CE level 0 and CE level 1, etc.) that is associated with a threshold for determining whether RAN node 111 is to block a particular UE 101.

In some embodiments, example table 300 may represent different types of instructions that MME 121 may provide to RAN node 111 about which UEs 101 are to be blocked from obtaining network access. In some embodiments, the instructions from MME 121 to RAN node 111 may include one criteria for blocking UEs 101. For example, MME 121 may provide RAN node 111 with a single CE level, such that RAN node 111 is to block any UEs 101 operating at the indicated CE level (e.g., level 2) and any inferior CE level (e.g., level 3). In some embodiments, the instructions from MME 121 to RAN node 111 may include one criteria for blocking UEs 101. For example, the instructions from MME 121 to RAN node 111 may include an indication that UEs 101 to be block include any UE that: 1) is operating at any CE level; and 2) is currently associated with a RSRP measurement below a particular threshold, which may be represented by one of the entry values (the first entry value, second entry value, or third entry value) of example table 300. Additionally, one or more of the information, show in example table 300, may be provided by MME 121 using one or more of the message and/or information described herein, and/or by any analogous message and/or IE.

In some embodiments, some or all of the information provided in example table 300 may be provided to UE 101. For example, some or all of the information provided in example table 300 may be broadcasted to UEs 101 as system information, which may include information (e.g., SysteminformationType14) discussed below with reference to Table 10). In some embodiments, for example, the first entry value, second, and third entry value, may correspond to index values in a rsrp-ThresholdsPrachInfoList parameter broadcasted to UEs 101 as system information. Providing UE 101 with such information may enable UE 101 to determine an appropriate CE mode and/or CE level based on a RSRP measured by UE 101.

In some embodiments, the entry values of FIG. 3 may correspond to values of the index parameter rsrp-ThresholdsPrachInfoList, which may be used by UE 101 to determine a CE level of the UE. For example, UE 101 may determine the CE level for the UE by measuring an RSRP and comparing the measured RSRP with RSRP thresholds associated with different CE levels. As described herein, when the UE receives information from RAN node 111 about which CE levels are blocked (e.g., SysteminformationType14 discussed below with respect to FIG. 10) UE 101 may determine whether it is blocked by comparing the received information with the determined CE level of UE 101.

Figure 4:
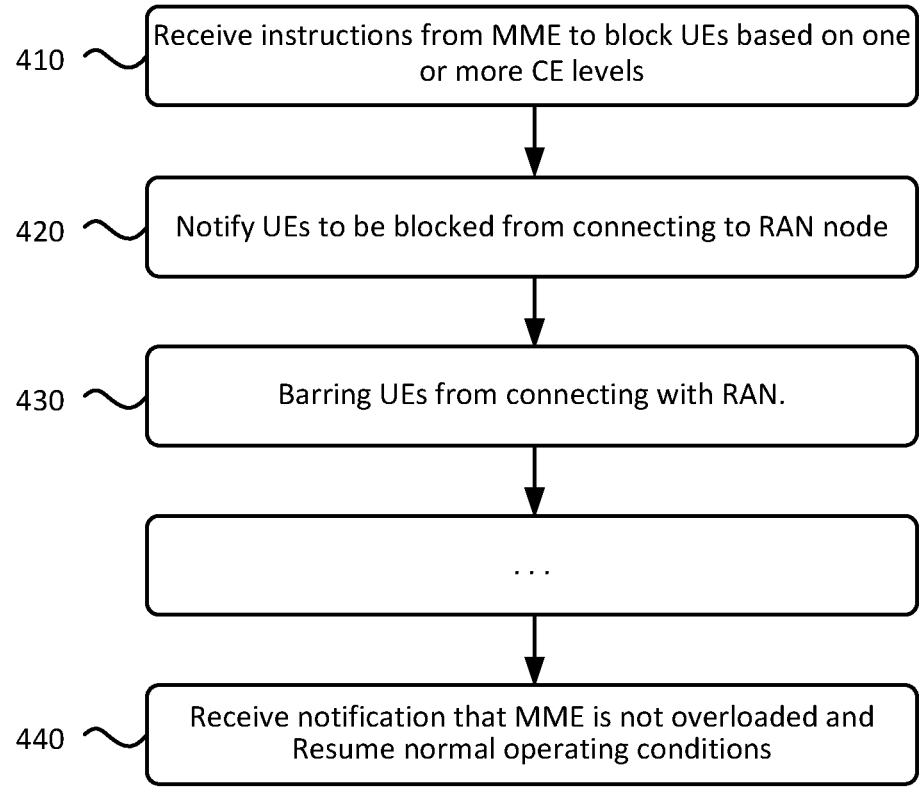
FIG. 4 is a block diagram of an example process for controlling network access for UEs while a Mobility Management Entity (MME) is overloaded.

FIG. 4 is a block diagram of an example process 400 for controlling network access for UEs while MME 121 is overloaded. Process 400 may be implemented by RAN node 111. In some embodiments, one or more of the operations described in FIG. 4 may be performed in whole, or in part, by another device described above with reference to FIG. 1.

As shown, process 400 may include receiving instructions from MME 121 to block UEs 121 based on one or more CE levels (block 410). For example, RAN node 111 may receive, from MME 121, instructions to block one or more UEs 101 of one or more CE levels from establishing a connection with RAN node 111. In some embodiments, the instructions from MME 121 may correspond to one or more entry values.

Process 400 may also include notifying UEs 101 that are to be blocked from connecting to RAN node 111 (block 420). For example, based on instructions received from MME 121, RAN node 111 may notify UEs 101, within a coverage area of RAN node 111, regarding UEs 101 that are to be blocked from establishing (and/or reestablishing) a connection with RAN node 111. In some embodiments, RAN node 111 may notify which UEs 101 are to be blocked by indicating one or more CE levels that are to be blocked. RAN node 111 may use paging message and/or broadcasted system information to notify UEs of CE levels being blocked. RAN node 111 may provide UEs in RRC_CONNECTED state and/or RRC_IDLE state information about CE levels being blocked.

In some embodiments, RAN node 111 may notify UEs 101 using one or more types of communications, such as paging message, broadcast message, etc. In some embodiments, RAN node 111 may use a paging message to indicate, to UEs 101, that system information (e.g., SIBs) for the RAN has changed, which may cause UEs 101 to obtain updated system information from RAN node 111, and thereby determine which UEs 101 are to be blocked by RAN node 111. In some embodiments, RAN node 111 may also indicate a duration for which UEs 101 of one or more CE levels are barred from connecting to RAN node 111. In such embodiments, blocked UEs 101 may refrain from attempting to establish a connection with RAN node 111 for the duration indicated, and at the end of the duration, may attempt to establish a connection with RAN node 111 and/or obtain new system information to determine whether the UE is still barred from connecting with RAN node 111, and may proceeding accordingly. In some embodiments, UE 101 may also, or alternatively, attempt to connect to another RAN node 111 in response to a notification of being blocked.

In some embodiments, RAN node 111 may use one or more IEs in a paging message to indicate which UEs 101 are to be barred by RAN node 111 and/or for how long the UEs 101 are to be barred. An example of such an IE is provided below in Table 5.

TABLE 5

Paging Message IE Indicating Barred Access for Certain UEs

```
aging-v1310-IEs ::=                         SEQUENCE {
    redistributionIndication-r13            ENUMERATED {true}        OPTIONAL,    --Need ON
    systemInfoModification-eDRX-r13         ENUMERATED {true}        OPTIONAL,    -- Need ON
    nonCriticalExtension                    Paging-v15xy-IEs         OPTIONAL
}
Paging-v15xy-IEs ::=                        SEQUENCE {
    ce-AccessBarNotification-r15            ENUMERATED {ce0, ce1, ce2, ce3, ce0123, ce23, ce13, ce12}
        OPTIONAL,                           -- Need OP
    ce-AccessBarDuration-r15                ENUMERATED {10s, 50s, 100s, 500s, 1000s spare, spare,
spare}  OPTIONAL,                           -- Need OP
    nonCriticalExtension                    SEQUENCE { }             OPTIONAL
}
```

A description of certain fields (e.g., ce-AccessBarNotification and ce-AccessBarDuration) represented in the example IE of Table 5 are provided below in Table 6.

TABLE 6

Examples of certain fields of the Example IE of Table 5 ce-AccessBarNotification
If present: indication of a cell access barring. ce0 may indicate UEs supporting CE level zero are barred, ce2e may indicate UEs supporting CE level 2 and CE level 3 are barred, and so on. If absent: an indication of release of cell access barring to all UEs supporting any CE level.
ce-AccessBarDuration
If present: indication of duration of the cell access barring. 10 s may indicate 10 seconds, 50 s may indicate 50 seconds, and so on. If absent: indication of infinite duration of the cell access barring. This field may only be applicable when ce-AccessBarNotification is present.

As mentioned above, RAN node 111 may use a paging message to indicate, to UEs 101, that system information for the RAN has been changed, updated, etc. Such a paging message may cause UEs 101 to obtain the updated system information and/or determine which UEs 101 are to be blocked by RAN node 111. Additionally, a paging message may include one or more IEs, such as the example IE provided below in Table 7.

TABLE 7

Paging Message IE Indicating Barred Access for CE level(s)

```
Paging-v1310-IEs ::=                        SEQUENCE {
    redistributionIndication-r13            ENUMERATED {true}        OPTIONAL,    --Need ON
    systemInfoModification-eDRX-r13         ENUMERATED {true}        OPTIONAL,    -- Need ON
    nonCriticalExtension                    Paging-v15xy-IEs         OPTIONAL
}
Paging-v15xy-IEs ::=                        SEQUENCE {
    ce-AccessBarNotification-r15            ENUMERATED {TRUE}        OPTIONAL,    -- Need ON
    nonCriticalExtension                    SEQUENCE { }             OPTIONAL
}
```

The presence (and/or TRUE status) of the ce-AccessBarNotification field, provided above with respect to Table 7, may indicate to UEs 101 that system information for the RAN has been updated, which may prompt UEs 101 to obtain the updated system information from RAN node 111.

Additionally, or alternatively, one or more bits of Direct Indication information (which may be transmitted via an MTC physical downlink control channel (MPDCCH) using a Paging-Radio Network Temporary Identifier (P-RNTI) but without an associated Paging message) may be used to indicate the CE level baring information (e.g., whether all CE levels are barred, a particular CE level, or all the CE levels greater than a given CE level, etc.). Table 8, provided below, may include an example of Direct Indication signaling, where one or more of bits 6-8 may be used to indicate CE level baring information.

TABLE 8

Example of Indicating CE Level Barring in Direct Indication Information

| Bit | Direct Indication information |
|---|---|
| 1 | systemInfoModification |
| 2 | etws-Indication |
| 3 | cmas-Indication |
| 4 | eab-ParamModification |
| 5 | systemInfoModification-eDRX |
| 6, 7, 8 | Used for indicating CE level baring information. |
| ... | |

In some embodiments, one or more of bits 6-8 may be used, dedicate, etc., to indicating whether all CE levels are barred. In some embodiments, bits 6 and 7 may indicate whether all CE levels that are the same, or equal to, a given CE level, are barred. More particularly, bit values 0,0 may indicate that no CE level are barred; bit values 0,1 may indicate that CE levels greater than, or equal to, CE level 0 are barred; bit values 1,0 may indicate that CE levels less than, or equal to, CE level 1 are barred; and bit values 1,1 may indicate that CE levels less than, or equal to, CE level 1 are barred. In some embodiments, bits 6 and 7 may indicate whether all the CE levels, greater than a given CE level, are barred. For example, bit values 0,0 may indicate that no CE levels are barred; bit values 0,1 may indicate that CE levels greater than CE level 0 are barred; bit values 1,0 ma indicate that CE levels greater than CE level 1 are barred, etc.

In some embodiments, RAN node 111 may use a Narrowband Physical Downlink Control Channel (NPDCCH) and a P-RNTI to notify certain UEs 101 (e.g., NB-IoT UEs) about UEs blocked by RAN node 111. Table 9, provided below, includes an example of Direct Indication message bits that may be used to notify UEs about which UEs 101 are being blocked.

TABLE 9

Example of Direct Indication Bits for Indicating Barred UEs

| Bit | Field in Direct Indication information |
|---|---|
| 1 | SystemInfoModification |
| 2 | systemInfoModification-Edrx |
| 3, 4, 5, 6, 7, 8 | Used to indicate barred UEs |

In some embodiments, bit 3 may indicate whether all CE levels are barred. In some embodiments, bits 3 and 4 may be used to indicate which UEs 101 or CE levels are barred. For example, bit values 0,0 may indicate that no CE levels are barred; bit values 0,1 may indicate that CE levels other than CE level 0 are barred; bit values 1,0 may indicate that CE levels greater than CE level 0 (e.g., CE level 1, CE level 2, etc.) are to be barred; and so on.

Additionally, or alternatively, RAN node 111 may use broadcast messages to indicate CE levels that are to be blocked by RAN node 111. For example, when RAN node 111 receives a notification indicating that: 1) MME 121 is overloaded; and 2) certain UEs 101 (and/or UEs of certain CE levels) are to be barred, RAN node 111 may broadcast one or more IEs to notify UEs 101 about which UEs 101 are to be blocked. In some embodiments, providing such a notification to blocked UEs 101 may cause blocked UEs 101 to refrain from attempting to establish (and/or re-establish) a connection with RAN node 111 (e.g., via a RRC Connection Request message). In some embodiments, RAN node 111 may schedule, or otherwise use, SystemInformationBlockType14, and/or other SIBs, to provide UEs 101 with such a notification, an example of which is provided below in Table 10. Doing so may notify UEs 101 about the cell access baring information before the UEs send RRC connection request messages, and may therefore cause UEs 101 from not doing so. In some embodiments, RAN node 111 may use SystemInformationBlockType14 for notifying certain types of UEs (e.g., NB-IoT UEs) about being barred. For NB-IoT UEs, ab-Enabled in the MasterinformationBlock-NB may be set to TRUE and SystemInformationBlockType14-NB may be broadcasted. In some embodiments, a SystemInformationBlockType14 for enhanced MTC (eMTC) may be used in a similar way as the SystemInformationBlockType14-NB.

TABLE 10

Example of SystemInformationBlockType14 with UE Barring Information

```
-- ASN1START
SystemInformationBlockType14-NB-r13 ::=    SEQUENCE {
    ab-Param-r13                               CHOICE {
        ab-Common-r13                             AB-Config-NB-r13,
        ab-PerPLMN-List-r13                       SEQUENCE (SIZE (1..maxPLMN-r11)) OF AB-
ConfigPLMN-NB-r13
    }                                                                          OPTIONAL, -- Need OR
    lateNonCriticalExtension                   OCTET STRING (CONTAINING AB-Config-NB-r15)
OPTIONAL,
    ...
}
AB-ConfigPLMN-NB-r13 ::=                   SEQUENCE {
    ab-Config-r13                              AB-Config-NB-r13          OPTIONAL -- Need OR
}
```

TABLE 10-continued

Example of SystemInformationBlockType14 with UE Barring Information

```
AB-Config-NB-r13 ::=              SEQUENCE {
   ab-Category-r13                   ENUMERATED {a, b, c},
   ab-BarringBitmap-r13              BIT STRING (SIZE(10)),
   ab-BarringExceptionData-r13       ENUMERATED {true}         OPTIONAL,    -- Need OP
   ab-BarringForSpecialAC-r13        BIT STRING (SIZE(5))
}
AB-Config-NB-r15 ::=SEQUENCE {
   ab-CELevel-r15                    ENUMERATED {ce0, ce1, ce2, ce3, ce0123, ce23, ce13, ce12},
OPTIONAL,    -- Need OR
   ab-CELevelDuration-r15            ENUMERATED {10s, 50s, 100s, 500s, 1000s spare, spare,
spare},     OPTIONAL,              -- Need OP
   lateNonCriticalExtension          OCTET STRING                                OPTIONAL,
}
-- ASN1STOP
```

A description of certain fields (e.g., ab-CELevel and ab-CELevelDuration) represented in the example IE of Table 10 are provided below in Table 11.

TABLE 11

Examples of certain fields of the example IE of Table 10 ab-CELevel
May indicate cell access barring for UE supporting a CE level. ce0 may indicate UEs
supporting CE level zero are barred, ce23 may indicate UEs supporting CE level 2 and CE
level 3 are barred, and so on.
ab-CELevelDuration
If present: may indicate of duration of the cell access barring. 10 s may indicate 10 seconds,
50 s may indicate 50 seconds, and so on. If absent: may signify infinite duration of cell
access barring. This field may be applicable only when ab-CELevel is present.

SystemInformationBlockType14, as described above with respect to Tables 10 and 11, may be examples of an IE that RAN node 111 may provide to a particular type of UE 101 (e.g., NB-IoT UEs). In some embodiments, for other types of UEs 101, RAN node 111 may use SystemInformationBlockType14 in a different manner, an example of which is provided below in Table 12.

TABLE 12

Example of SystemInformationBlockType14 with UE Barring Information

```
-- ASN1START
SystemInformationBlockType14-r11 ::=   SEQUENCE {
   eab-Param-r11                        CHOICE {
      eab-Common-r11                       EAB-Config-r11,
      eab-PerPLMN-List-r11                 SEQUENCE (SIZE (1..maxPLMN-r11)) OF
EAB-ConfigPLMN-r11
   }                                                        OPTIONAL, -- Need OR
   lateNonCriticalExtension             OCTET STRING (CONTAINING AB-Config-r15)
OPTIONAL,
   ...
}
EAB-ConfigPLMN-r11 ::=                 SEQUENCE {
   eab-Config-r11                       EAB-Config-r11           OPTIONAL -- Need OR
}
EAB-Config-r11 ::=                     SEQUENCE {
   eab-Category-r11                     ENUMERATED {a, b, c},
   eab-BarringBitmap-r11                BIT STRING (SIZE (10))
}
AB-Config-r15 ::=                      SEQUENCE {
   ab-CELevel-r15                       ENUMERATED {ce0, ce1, ce2, ce3, ce0123, ce23,
ce13, ce12},   OPTIONAL,              -- Need OR
   ab-CELevelDuration-r15                                        ENUMERATED {10s, 50s, 100s,
500s, 1000s spare, spare, spare },    OPTIONAL,          -- Need OP
   lateNonCriticalExtension             OCTET STRING                   OPTIONAL,
}
-- ASN1STOP
```

A description of certain fields (e.g., ab-CELevel and ab-CELevelDuration) represented in the example IE of Table 10 are provided below in Table 13.

TABLE 13

Examples of certain fields of the example IE of Table 12 ab-CELevel
May indicate cell access barring for UE supporting a CE level. ce0 may indicate UEs supporting CE level zero are barred, ce23 may indicate UEs supporting CE level 2 and CE level 3 are barred, and so on.
ab-CELevelDuration
If present: may indicate of duration of the cell access barring. 10 s may indicate 10 seconds, 50 s may indicate 50 seconds, and so on. If absent: may signify infinite duration of cell access barring. This field may be applicable only when ab-CELevel is present.

Referring to FIG. 4, process 400 may include barring one or more UEs 101 from connecting (and/or reconnecting) with RAN node 111 (block 430). For example, based on instructions received from MME 121, RAN node 111 may bar, block, prevent, etc., one or more UEs 101 from establishing a connection (and/or reconnecting) with RAN node 111. In some embodiments, the instructions form MME 121 may pertain to one or more types of UEs 101 (e.g., broadband UEs, NB-IoTs, etc.). Additionally, or alternatively, the instructions may pertain only to UEs 101 operating in a particular mode (e.g., an idle mode). For instance, based on the instructions from MME 121, RAN node 111 may block, ignore, etc., subsequent connections requests from UEs 101 of the temporarily prohibited CE level(s) identified by MME 121; however, RAN node 111 may not interrupt, discontinue, etc., current and active connections with UEs 101 regardless of a CE level corresponding to the UE.

As noted above, the instructions from MME 121 may pertain to blocking UEs 101 based on one criteria (e.g., UEs 101 operating in one or more CE levels specified by MME 121). Additionally, or alternatively, the instruction may pertain to blocking UEs 101 based one multiple criterium (e.g., UEs 101 that: 1) are operating in a CE mode; and 2) are associated with a measured RSRP below a particular signaling threshold. Examples of such scenarios are discussed above with reference to FIG. 3.

In time, RAN node 11 may receive a notification that MME 121 is not overloaded, and in response thereto, may resume normal operating conditions (block 440). For example, when MME 121 is no longer overloaded, MME 121 may notify, send instructions to, etc., RAN node 111 to indicate that MME 121 is no longer overloaded. The information from MME 121 may also, or alternatively, include instructions from RAN node 111 to resume normal operating conditions (e.g., by discontinuing the barring of certain UEs 101). As such, upon receiving an indication that MME 121 is not overloaded, and or instructions corresponding thereto, RAN node 111 may resume normal operating conditions by, for example, permitting barred UEs 101 to connection to RAN node 111.

Figure 5:
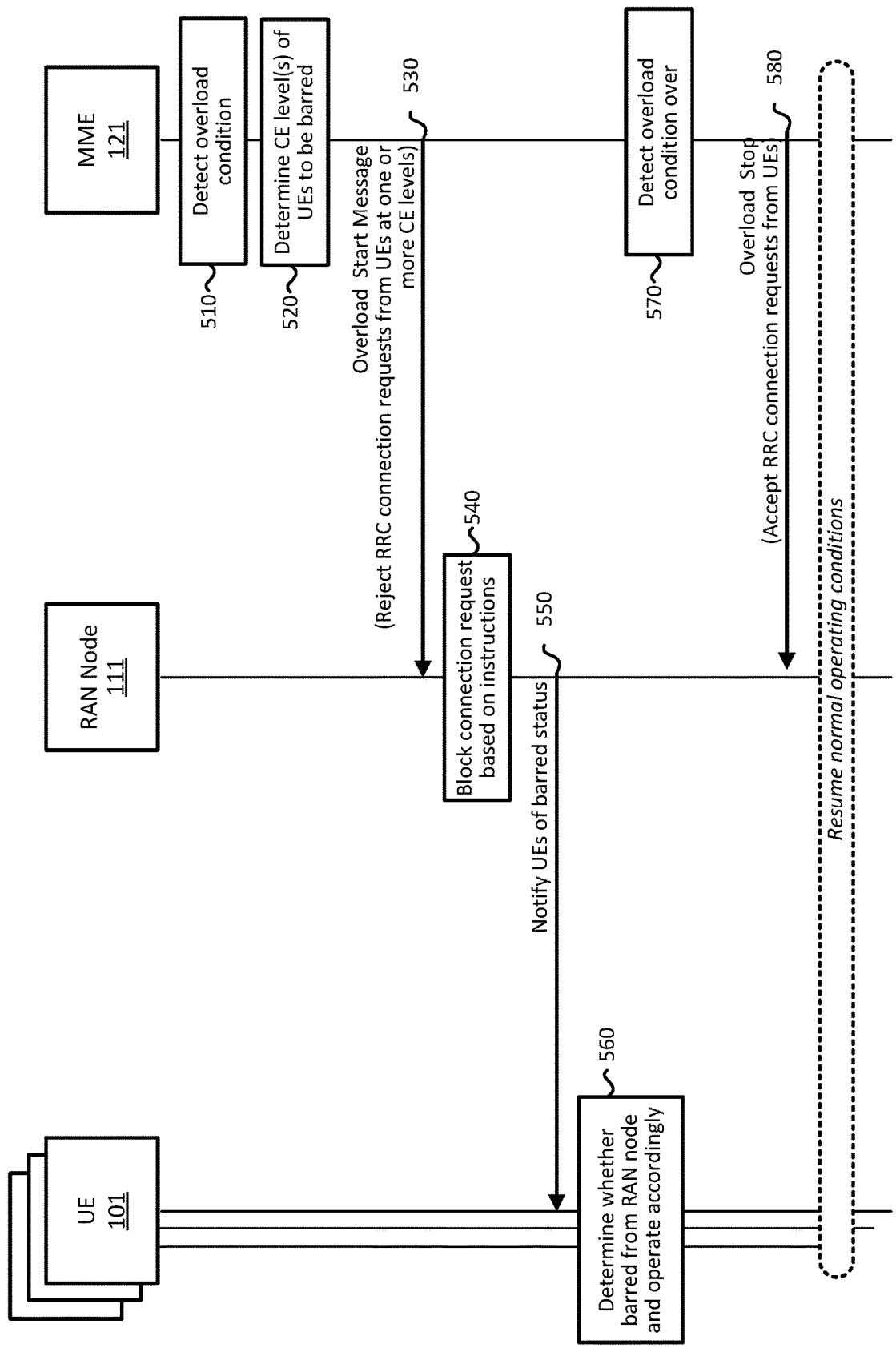
FIG. 5 is a sequence flow diagram of an example process for managing MME overload scenarios by controlling network access for UEs.

FIG. 5 is a sequence flow diagram of an example process for managing MME 121 overload scenarios by controlling network access for UEs 101. As shown, the example of FIG. 3 may include UE 101, RAN node 111, and MME 121. The example of FIG. 5 is provided as a non-limiting example. In practice, the example of FIG. 5 may include fewer, additional, alternative, operations or functions. Additionally, one or more of the operations or functions of FIG. 5 may be performed by fewer, additional, or alternative devices, which may include one or more of the devices described above with reference to FIG. 1.

As shown, as MME 121 operates under normal condition, MME 121 may monitor a level of activity of MME 121. At some point, MME 121 may determine that MME 121 is overloaded (at 510) which may be based on one or more a variety of factors, such as a number of UEs 101 registered with MME 121, a current mode of operation (e.g., active, idle, etc.) of UEs 101 registered with MME 121, a quantity and activity level of certain types of UEs 101 (e.g. broadband UEs, narrowband UEs, IoT devices, MTC device, etc.), a number of UEs 101 in one or more CE modes and/or CE levels, a quantity of one or more resources (e.g., processing resources, memory resources, communication resources, etc.) available to MME 121, etc.

In response to determining that MME 121 is overloaded, MME 121 may determine UEs 101 (and/or CE levels) to be barred from establishing a connection with RAN node 111 (at 520). In some embodiments, MME 121 may also, or alternative, determine UEs 101 to be barred by determining which CE levels to bar from accessing RAN node 111, and by extension, determine UEs 101 to be barred. In some embodiments MME 121 may determine which UEs 101 (and/or CE levels) to bar based on one or more factors, which may include, be a result of, or otherwise relate to, one or more of the conditions that has contributed to MME 121 becoming overloaded (e.g., a quantity, activity level, and/or operational mode (e.g., active mode, idle mode, etc.) of one or more types of UEs 101 registered with MME 121).

As shown, MME 121 may communicate instructions to RAN node 111 to bar, block, reject, etc., connection requests from certain UEs 101 (e.g., UEs 101 corresponding to one or more CE levels indicated by the instructions) (at 530) and in response, RAN node 111 may proceed to block such communications from UEs 101 accordingly (at 540). Based on the instructions from MME 121, RAN node 111 may block connections requests from UEs 101 and/or bar UEs 101 from otherwise accessing the cell. In some embodiments, RAN node 111 may also, or alternately, notify one or more UEs 101 about being barred (at 550). As described above, RAN node 111 may notify UEs 101 using a paging or broadcast, which may involve one or more of a variety of IEs. This notification may be broadcasted to UEs 101 as system information.

In response, each UE 101 may determine whether the UE is barred from connecting (and/or reconnecting) with RAN node 111 (at 560). For example, UE 111 may measure an RSRP and compare the measured RSRP to thresholds (e.g., entry value 1, entry value 2, entry value 3, described above with reference to FIG. 3) to determine a CE level of UE 111. UE 111 may then determine, based on the system information from RAN node 111 (e.g., SysteminformationType14, described above with reference to Table 10) whether the CE level of UE 111 is barred). If UE 101 is blocked, UE 101 may respond by refraining from attempting to connect (and/or reconnect) with RAN node 111 for a period of time (which may also be indicated in the system information or otherwise). At some point, MME 121 may determine that MME 121 is no longer overloaded (at 570). In response, MME 121 may contact RAN node 111 about change in status, which may include one or more RRC messages with instructions for RAN node 111 to return to normal operating conditions by, for example, no longer blocking connection requests from UEs 101, broadcasting updated system information to UEs 101 (about not blocking CE levels), and/or accepting RRC connection requests from UEs 101 (at 580). In some embodiments, RAN node 111 may send paging messages to UEs 101 previous blocked to notify UEs 101 to obtain new system information broadcasted by RAN node 111, which (per the instructions from MME 121) may indicate to the UEs 101 that they are no longer blocked (e.g., that the CE level of the UEs 101 is no longer blocked) such that the UEs 101 may establish a connection with the RAN node 121.

Figure 6:
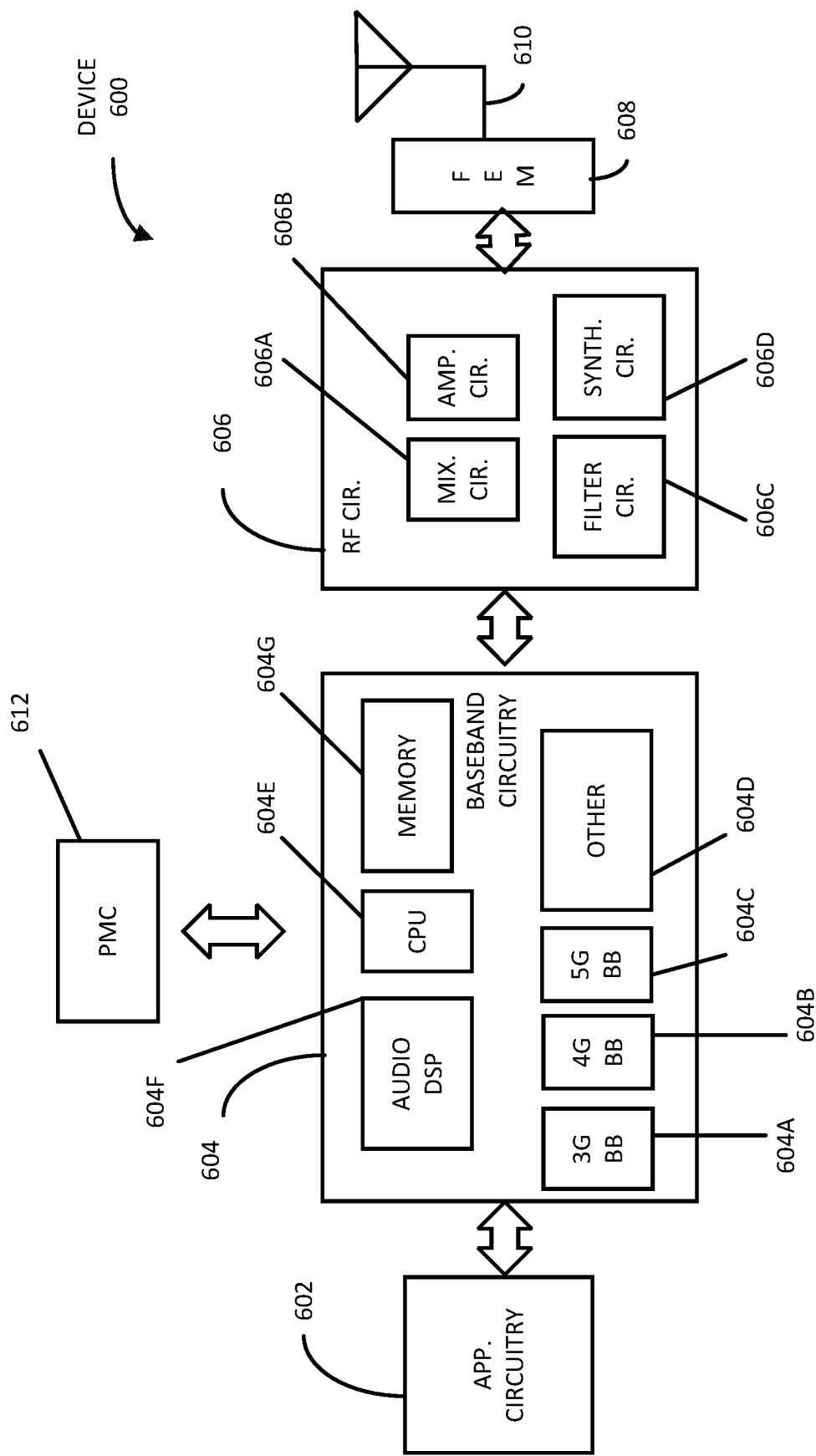
FIG. 6 is a block diagram of example components of a device in accordance with some embodiments.

FIG. 6 illustrates example components of a device 600 in accordance with some embodiments. In some embodiments, the device 600 may include application circuitry 602, baseband circuitry 604, Radio Frequency (RF) circuitry 606, front-end module (FEM) circuitry 608, one or more antennas 610, and power management circuitry (PMC) 612 coupled together at least as shown. The components of the illustrated device 600 may be included in a UE or a RAN node. In some embodiments, the device 600 may include less elements (e.g., a RAN node may not utilize application circuitry 602, and instead include a processor/controller to process IP data received from an EPC). In some embodiments, the device 600 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 600. In some embodiments, processors of application circuitry 602 may process IP data packets received from an EPC.

The baseband circuitry 604 may include circuitry such as, but not limited to, one or more single-core or multi-core processors. The baseband circuitry 604 may include one or more baseband processors or control logic to process baseband signals received from a receive signal path of the RF circuitry 606 and to generate baseband signals for a transmit signal path of the RF circuitry 606. Baseband processing circuity 604 may interface with the application circuitry 602 for generation and processing of the baseband signals and for controlling operations of the RF circuitry 606. For example, in some embodiments, the baseband circuitry 604 may include a third generation (3G) baseband processor 604A, a fourth generation (4G) baseband processor 604B, a fifth generation (5G) baseband processor 604C, or other baseband processor(s) 604D for other existing generations, generations in development or to be developed in the future (e.g., second generation (2G), si6h generation (6G), etc.).

The baseband circuitry 604 (e.g., one or more of baseband processors 604A-D) may handle various radio control functions that enable communication with one or more radio networks via the RF circuitry 606. In other embodiments, some or all of the functionality of baseband processors 604A-D may be included in modules stored in the memory 604G and executed via a Central Processing Unit (CPU) 604E. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), preceding, or constellation mapping/demapping functionality. In some embodiments, encoding/decoding circuitry of the baseband circuitry 604 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include one or more audio digital signal processor(s) (DSP) 604F. The audio DSP(s) 604F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the receive signal path of the RF circuitry 606 may include mixer circuitry 606*a*, amplifier circuitry 606*b* and filter circuitry 606*c*. In some embodiments, the transmit signal path of the RF circuitry 606 may include filter circuitry 606*c* and mixer circuitry 606*a*. RF circuitry 606 may also include synthesizer circuitry 606*d* for synthesizing a frequency for use by the mixer circuitry 606*a* of the receive signal path and the transmit signal path. In some embodiments, the mixer circuitry 606*a* of the receive signal path may be configured to down-convert RF signals received from the FEM circuitry 608 based on the synthesized frequency provided by synthesizer circuitry 606*d*. The amplifier circuitry 606*b* may be configured to amplify the down-converted signals and the filter circuitry 606*c* may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606*a* of the receive signal path may comprise passive mixers, although the scope of the embodiments is not limited in this respect.

In some embodiments, the mixer circuitry 606*a* of the transmit signal path may be configured to up-convert input baseband signals based on the synthesized frequency provided by the synthesizer circuitry 606*d* to generate RF output signals for the FEM circuitry 608. The baseband signals may be provided by the baseband circuitry 604 and may be filtered by filter circuitry 606*c*.

In some embodiments, the mixer circuitry 606*a* of the receive signal path and the mixer circuitry 606*a* of the transmit signal path may include two or more mixers and may be arranged for quadrature downconversion and upconversion, respectively. In some embodiments, the mixer circuitry 606*a* of the receive signal path and the mixer circuitry 606*a* of the transmit signal path may include two or more mixers and may be arranged for image rejection (e.g., Hartley image rejection). In some embodiments, the mixer circuitry 606*a* of the receive signal path and the mixer circuitry 606*a* may be arranged for direct downconversion and direct upconversion, respectively. In some embodiments, the mixer circuitry 606*a* of the receive signal path and the mixer circuitry 606*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606*d* may be a fractional-N synthesizer or a fractional N/N+1 synthesizer, although the scope of the embodiments is not limited in this respect as other types of frequency synthesizers may be suitable. For example, synthesizer circuitry 606*d* may be a delta-sigma synthesizer, a frequency multiplier, or a synthesizer comprising a phase-locked loop with a frequency divider.

The synthesizer circuitry 606*d* may be configured to synthesize an output frequency for use by the mixer circuitry 606*a* of the RF circuitry 606 based on a frequency input and a divider control input. In some embodiments, the synthesizer circuitry 606*d* may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606*d* of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610. In various embodiments, the amplification through the transmit or receive signal paths may be done solely in the RF circuitry 606, solely in the FEM 608, or in both the RF circuitry 606 and the FEM 608.

In some embodiments, the FEM circuitry 608 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610).

In some embodiments, the PMC 612 may manage power provided to the baseband circuitry 604. In particular, the PMC 612 may control power-source selection, voltage scaling, battery charging, or DC-to-DC conversion. The PMC 612 may often be included when the device 600 is capable of being powered by a battery, for example, when the device is included in a UE. The PMC 612 may increase the power conversion efficiency while providing desirable implementation size and heat dissipation characteristics.

While FIG. 6 shows the PMC 612 coupled only with the baseband circuitry 604. However, in other embodiments, the PMC 6 12 may be additionally or alternatively coupled with, and perform similar power management operations for, other components such as, but not limited to, application circuitry 602, RF circuitry 606, or FEM 608.

In some embodiments, the PMC 612 may control, or otherwise be part of, various power saving mechanisms of the device 600. For example, if the device 600 is in an RRC_Connected state, where it is still connected to the RAN node as it expects to receive traffic shortly, then it may enter a state known as Discontinuous Reception Mode (DRX) after a period of inactivity. During this state, the device 600 may power down for brief intervals of time and thus save power.

If there is no data traffic activity for a period of time, then the device 600 may transition off to an RRC_Idle state, where it disconnects from the network and does not perform operations such as channel quality feedback, handover, etc. The device 600 goes into a very low power state and it performs paging where again it periodically wakes up to listen to the network and then powers down again. The device 600 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 602 and processors of the baseband circuitry 604 may be used to execute elements of one or more instances of a protocol stack. For example, processors of the baseband circuitry 604, alone or in combination, may be used execute Layer 3, Layer 2, or Layer 1 functionality, while processors of the application circuitry 604 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
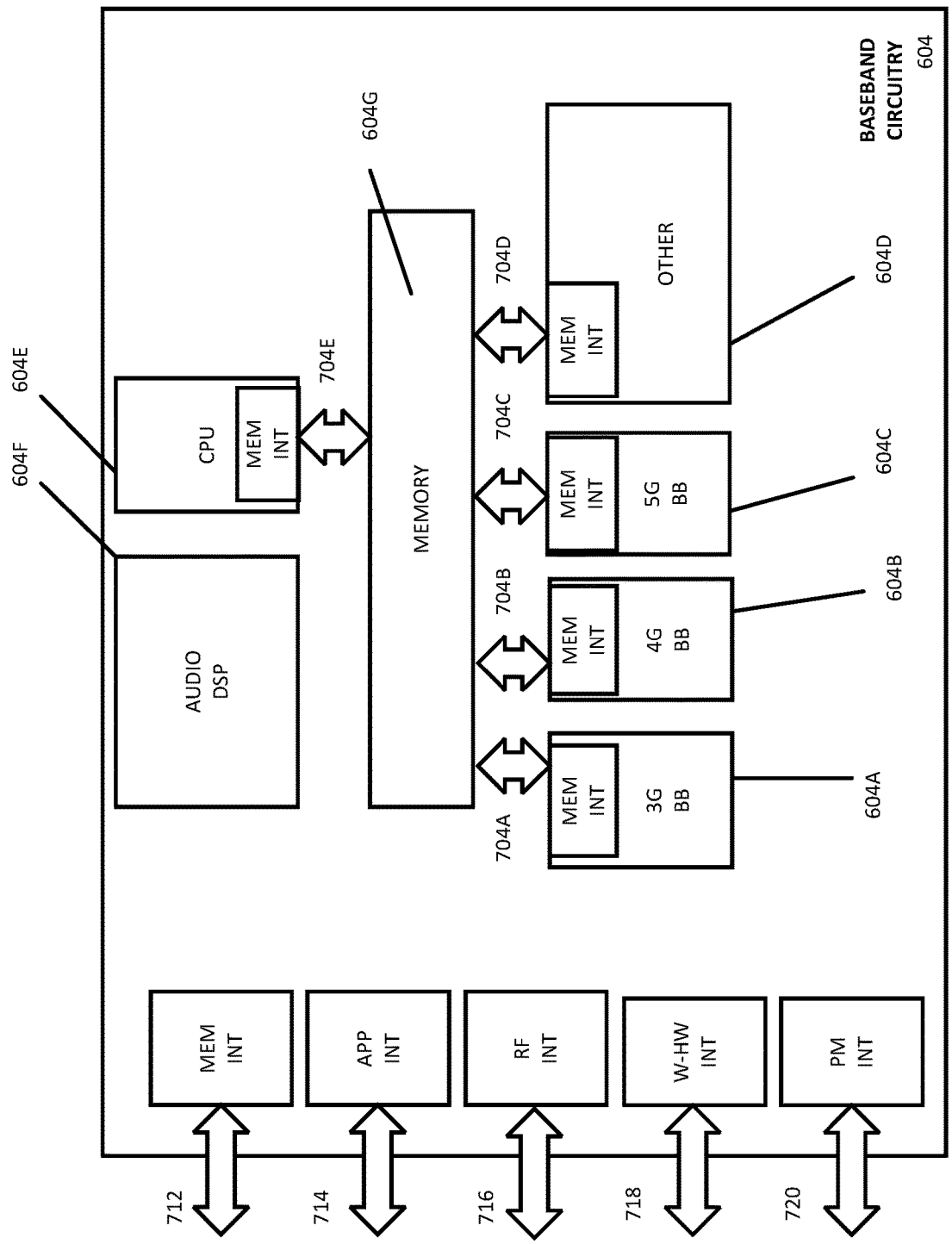
FIG. 7 is a block diagram of example interfaces of baseband circuitry in accordance with some embodiments.

FIG. 7 illustrates example interfaces of baseband circuitry in accordance with some embodiments. As discussed above, the baseband circuitry 604 of FIG. 6 may comprise processors 604A-604E and a memory 604G utilized by said processors. Each of the processors 604A-604E may include a memory interface, 704A-704E, respectively, to send/receive data to/from the memory 604G.

The baseband circuitry 604 may further include one or more interfaces to communicatively couple to other circuitries/devices, such as a memory interface 712 (e.g., an interface to send/receive data to/from memory external to the baseband circuitry 604), an application circuitry interface 714 (e.g., an interface to send/receive data to/from the application circuitry 602 of FIG. 6), an RF circuitry interface 716 (e.g., an interface to send/receive data to/from RF circuitry 606 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMC 612.

Figure 8:
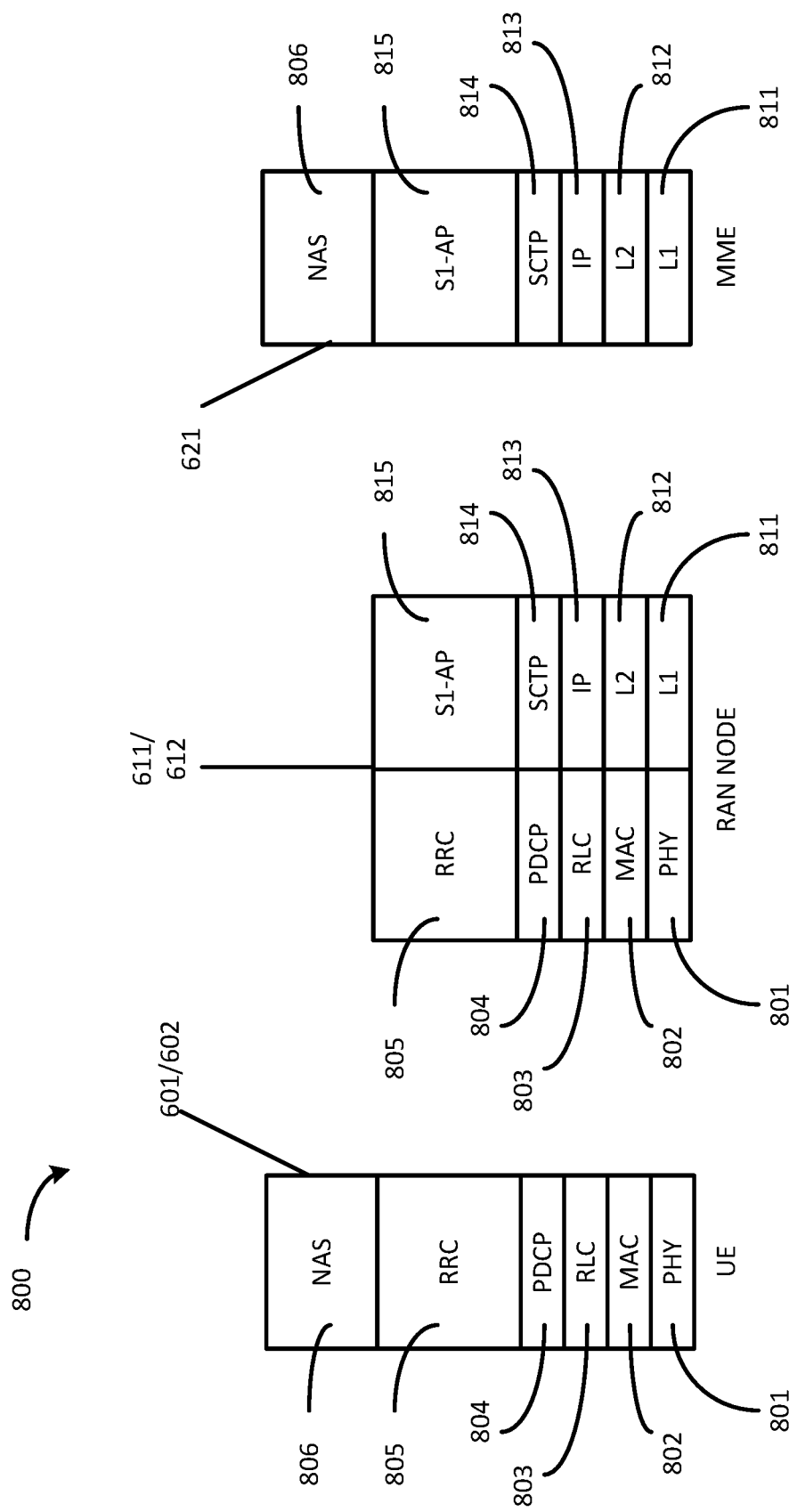
FIG. 8 is a block diagram of an example control plane protocol stack in accordance with some embodiments.

FIG. 8 is an illustration of a control plane protocol stack in accordance with some embodiments. In this embodiment, a control plane 800 is shown as a communications protocol stack between the UE 101 (or alternatively, the UE 102), the RAN node 111 (or alternatively, the RAN node 112), and the MME 121.

The PHY layer 801 may transmit or receive information used by the MAC layer 802 over one or more air interfaces. The PHY layer 801 may further perform link adaptation or adaptive modulation and coding (AMC), power control, cell search (e.g., for initial synchronization and handover purposes), and other measurements used by higher layers, such as the RRC layer 805. The PHY layer 801 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 802 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 803 may operate in a plurality of modes of operation, including: Transparent Mode (TM), Unacknowledged Mode (UM), and Acknowledged Mode (AM). The RLC layer 803 may execute transfer of upper layer protocol data units (PDUs), error correction through automatic repeat request (ARQ) for AM data transfers, and concatenation, segmentation and reassembly of RLC SDUs for UM and AM data transfers. The RLC layer 803 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 805 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 801, the MAC layer 802, the RLC layer 803, the PDCP layer 804, and the RRC layer 805.

The non-access stratum (NAS) protocols 806 form the highest stratum of the control plane between the UE 101 and the MME 121. The NAS protocols 806 support the mobility of the UE 101 and the session management procedures to establish and maintain IP connectivity between the UE 101 and the P-GW 123.

The S1 Application Protocol (S1-AP) layer 815 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 814 may ensure reliable delivery of signaling messages between the RAN node 111 and the MME 121 based, in part, on the IP protocol, supported by the IP layer 813. The L2 layer 812 and the L1 layer 811 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 811, the L2 layer 812, the IP layer 813, the SCTP layer 814, and the S1-AP layer 815.

Figure 9:
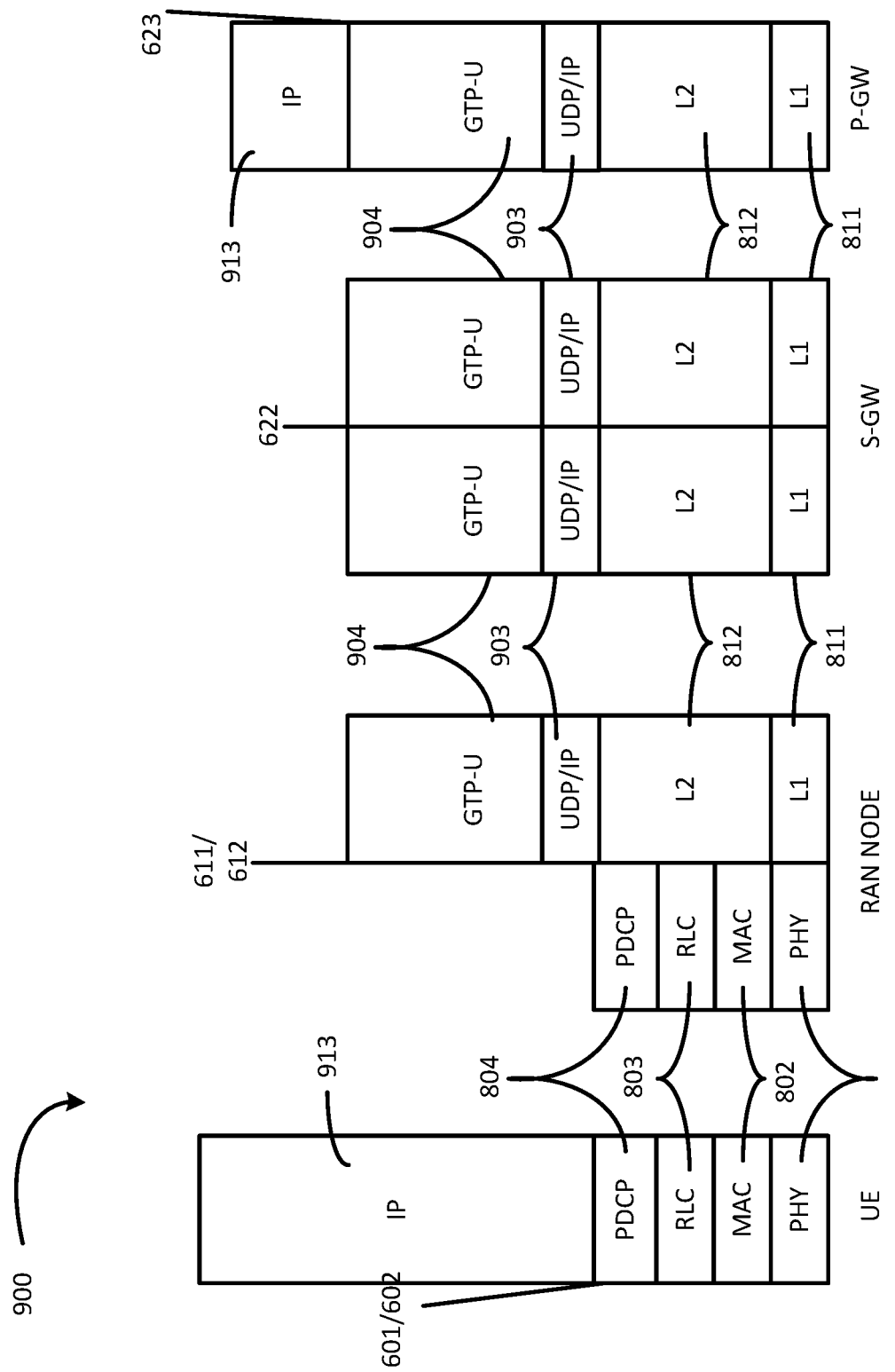
FIG. 9 is a block diagram of an example user plane protocol stack in accordance with some embodiments.

FIG. 9 is an illustration of a user plane protocol stack in accordance with some embodiments. In this embodiment, a user plane 900 is shown as a communications protocol stack between the UE 101 (or alternatively, the UE 102), the RAN node 111 (or alternatively, the RAN node 112), the S-GW 122, and the P-GW 123. The user plane 900 may utilize at least some of the same protocol layers as the control plane 800. For example, the UE 101 and the RAN node 111 may utilize a Uu interface (e.g., an LTE-Uu interface) to exchange user plane data via a protocol stack comprising the PHY layer 801, the MAC layer 802, the RLC layer 803, the PDCP layer 804.

The General Packet Radio Service (GPRS) Tunneling Protocol for the user plane (GTP-U) layer 904 may be used for carrying user data within the GPRS core network and between the radio access network and the core network. The user data transported can be packets in any of IPv4, IPv6, or PPP formats, for example. The UDP and IP security (UDP/IP) layer 903 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 811, the L2 layer 812, the UDP/IP layer 903, and the GTP-U layer 904. The S-GW 122 and the P-GW 123 may utilize an S5/S8a interface to exchange user plane data via a protocol stack comprising the L1 layer 811, the L2 layer 812, the UDP/IP layer 903, and the GTP-U layer 904. As discussed above with respect to FIG. 8, NAS protocols support the mobility of the UE 101 and the session management procedures to establish and maintain IP connectivity between the UE 101 and the P-GW 123.

Figure 10:
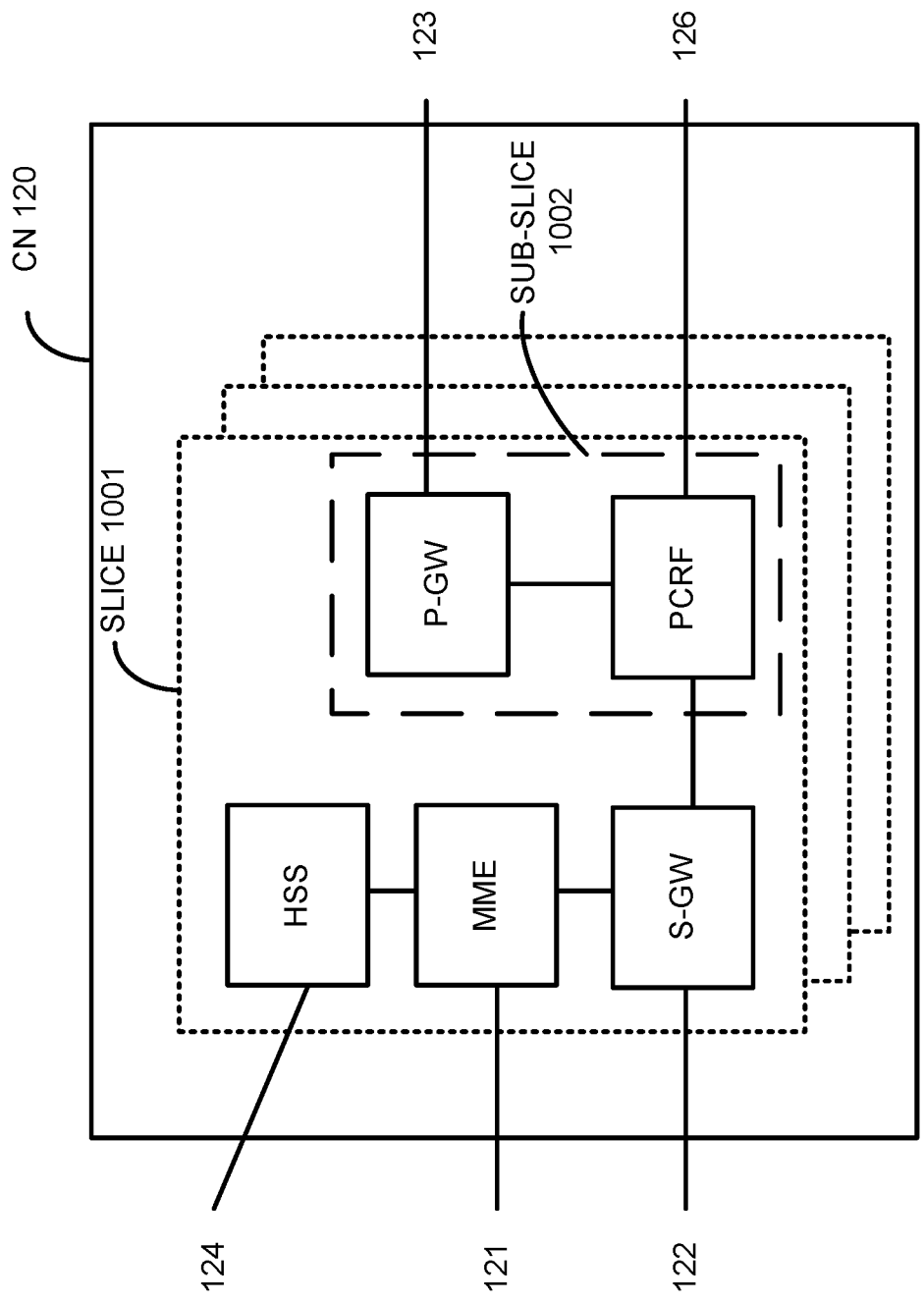
FIG. 10 illustrates components of a core network in accordance with some embodiments.

FIG. 10 illustrates components of a core network in accordance with some embodiments. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 120 may be referred to as a network slice 1001. A logical instantiation of a portion of the CN 120 may be referred to as a network sub-slice 1002 (e.g., the network sub-slice 1102 is shown to include the PGW 123 and the PCRF 126).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 11:
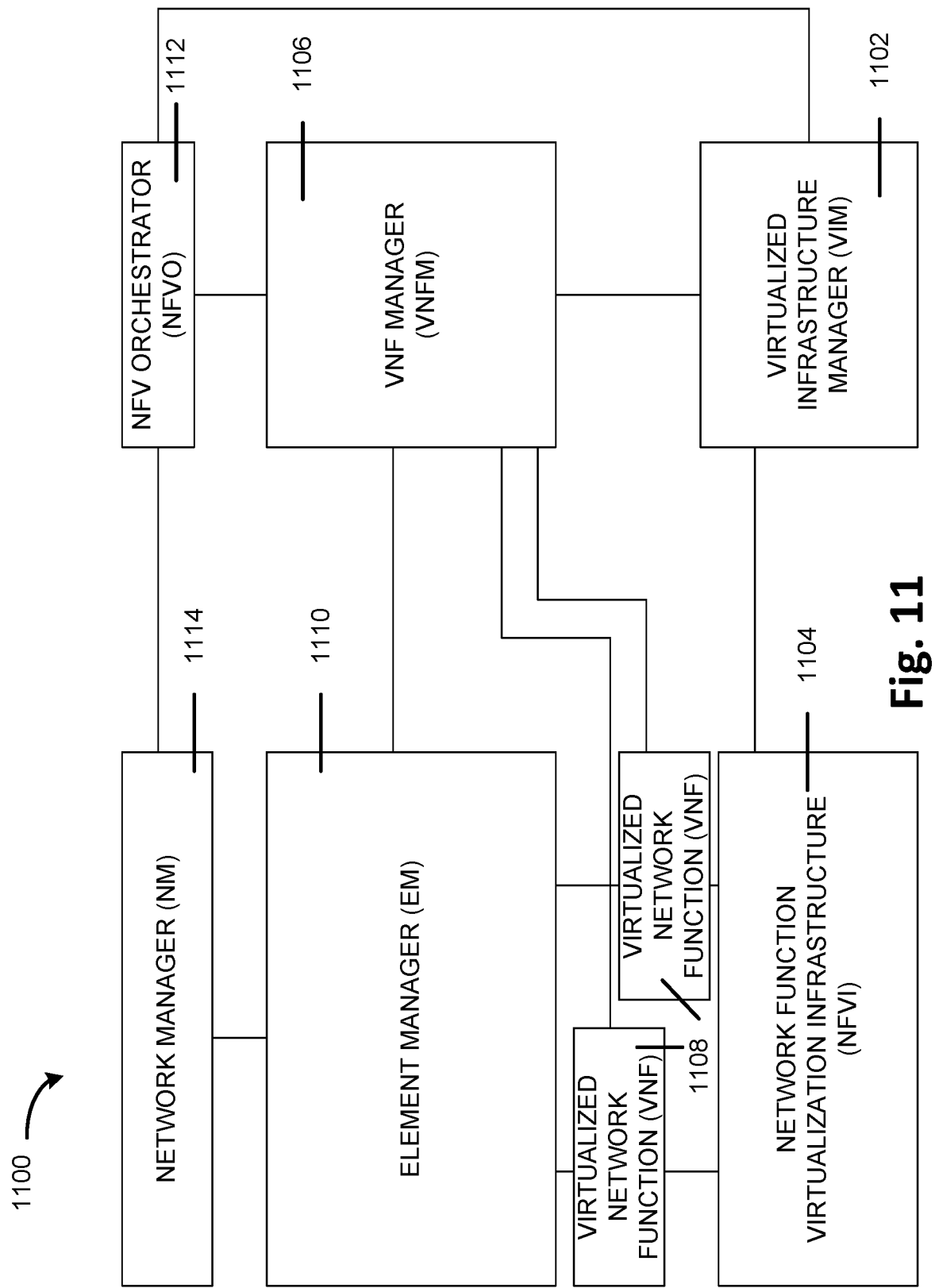
FIG. 11 is a block diagram illustrating components, according to some example embodiments, of a system 1100 to support Network Functions Virtualization (NFV)

FIG. 11 is a block diagram illustrating components, according to some example embodiments, of a system 1100 to support NFV. The system 1100 is illustrated as including a virtualized infrastructure manager (VIM) 1102, a network function virtualization infrastructure (NFVI) 1104, a VNF manager (VNFM) 1106, virtualized network functions (VNFs) 1108, an element manager (EM) 1110, an NFV Orchestrator (NFVO) 1112, and a network manager (NM) 1114.

The VIM 1102 manages the resources of the NFVI 1104. The NFVI 1104 can include physical or virtual resources and applications (including hypervisors) used to execute the system 1100. The VIM 1102 may manage the life cycle of virtual resources with the NFVI 1104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1106 may manage the VNFs 1108. The VNFs 1108 may be used to execute EPC components/functions. The VNFM 1106 may manage the life cycle of the VNFs 1108 and track performance, fault and security of the virtual aspects of VNFs 1108. The EM 1110 may track the performance, fault and security of the functional aspects of VNFs 1108. The tracking data from the VNFM 1106 and the EM 1110 may comprise, for example, performance measurement (PM) data used by the VIM 1102 or the NFVI 1104. Both the VNFM 1106 and the EM 1110 can scale up/down the quantity of VNFs of the system 1100.

The NFVO 1112 may coordinate, authorize, release and engage resources of the NFVI 1104 in order to provide the requested service (e.g., to execute an EPC function, component, or slice). The NM 1114 may provide a package of end-user functions with the responsibility for the management of a network, which may include network elements with VNFs, non-virtualized network functions, or both (management of the VNFs may occur via the EM 1110).

Figure 12:
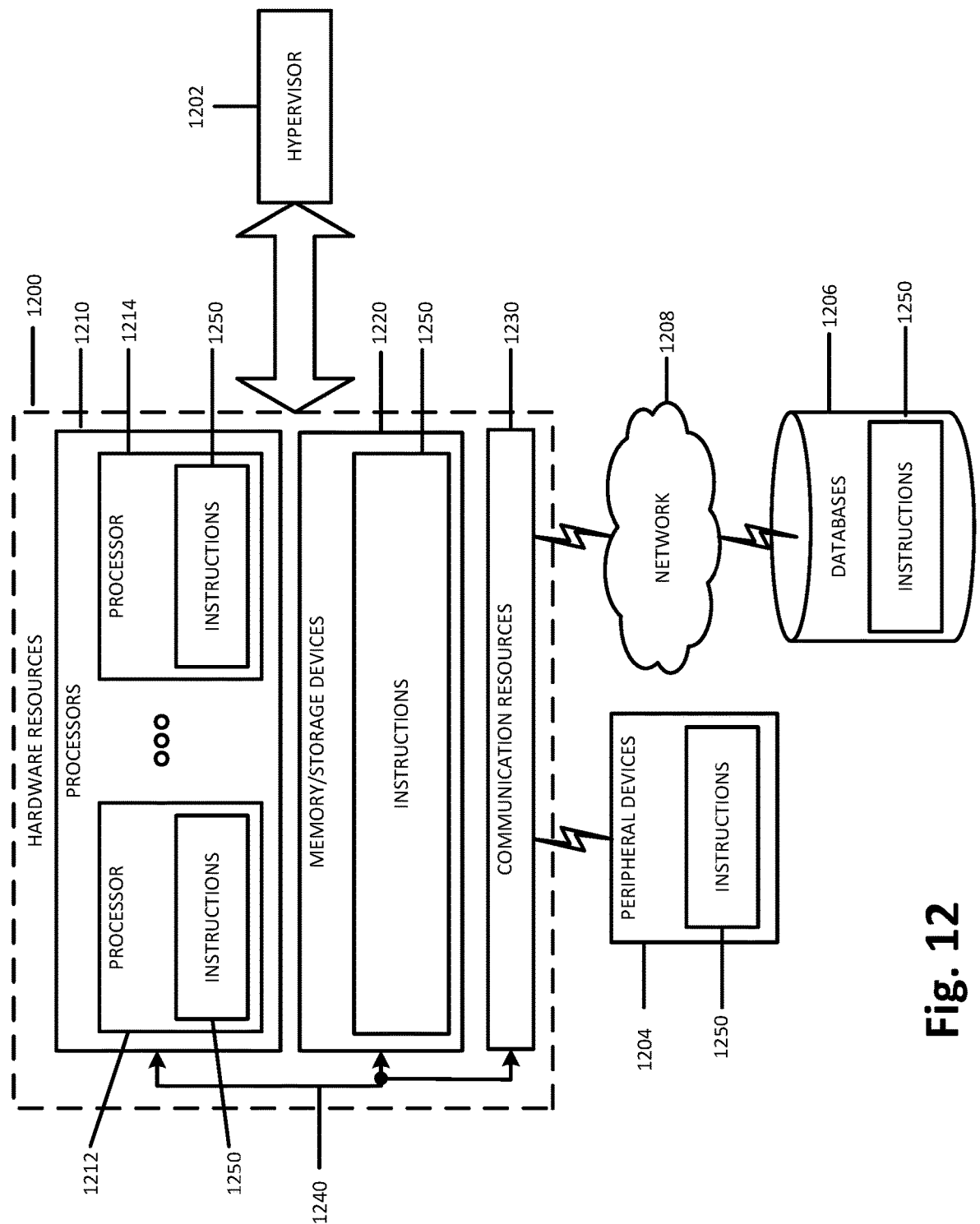
FIG. 12 is a block diagram of example components, according to some example embodiments, able to read instructions from a machine-readable or computer-readable medium (e.g., a non-transitory machine-readable storage medium) and perform any one or more of the methodologies discussed herein.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

A number of examples, relating to embodiments of the techniques described above, will next be given.

In a first example, an apparatus of a Mobility Management Entity (MME) may comprise: a storage device configured to store one or more instructions; and one or more processors configured to execute the one or more instruction to: detect that the MME is overloaded; determine at least one Coverage Enhancement (CE) level of User Equipment (UEs) to bar from connecting with a Radio Access Network (RAN) node; and cause instructions, to be communicated to the RAN node, to block UEs of the at least one CE from establishing connections with the RAN.

In example 2, the subject matter of example 1, or any of the examples herein, wherein the instructions for the RAN node to block UEs of the at least one CE level include instructions to for the RAN node to reject Radio Resource Control (RRC) requests from UEs of the at least one CE level.

In example 3, the subject matter of example 1, or any of the examples herein, wherein the instructions for the RAN node to block UEs of the at least one CE level cause the RAN node to broadcast system information indicating that cell access to the at least one CE level is blocked.

In example 4, the subject matter of example 1, or any of the examples herein, wherein the one or more processors are further to: monitor a load status of the MME; determine that the MME is not overloaded; and notify the RAN node that the UEs of the at least one CE level are not to be blocked from establishing connection with the RAN.

In example 5, the subject matter of example 1, or any of the examples herein, wherein a CE level of a UE is based on a measured Reference Signal Received Power (RSRP) of the UE.

In a sixth example, an apparatus of a Radio Access Network (RAN) node may comprise an interface to radio frequency (RF) circuitry; and one or more processors that are controlled to: process instructions, received from a Mobility Management Entity (MME), to block UEs of at least one Coverage Enhancement (CE) level from establishing a connection with the RAN node; and cause system information to be broadcasted, via the interface to radio frequency (RF) circuitry, indicating that the at least one CE level is blocked.

In example 7, the subject matter of example 6, or any of the examples herein, wherein the system information includes a SystemInformationBlockType14 Information Element (IE) for enhanced Machine-Type-Communication (eMTC) indicating the at least one CE level.

In example 8, the subject matter of example 6, or any of the examples herein, wherein the system information includes a SystemInformationBlockType14-NB Information Element (IE) for Narrowband Internet-of-Things (NB-IoT) devices indicating the at least one CE level.

In example 9, the subject matter of example 6, or any of the examples herein, wherein the at least one CE level includes all CE levels that UEs may use to communicate with the RAN node.

In example 10, the subject matter of example 6, or any of the examples herein, wherein the one or more processors are further to: process instructions from the MME to discontinue blocking UEs of the at least one CE level; and update the system information broadcasted by the RAN node to indicate that the UEs of the at least one CE level are no longer being blocked by the RAN node In an eleventh example, an apparatus of a User Equipment (UE) may comprise an interface to radio frequency (RF) circuitry; and one or more processors that are controlled to: receive, via the interface to the RF circuitry, system information, from a Radio Access Network (RAN) node, that UEs of at least one CE level are being blocked from establishing a connection with the RAN node; determine a measured Reference Signal Received Power (RSRP) of the UE; determine a CE level of the UE based on the measured RSRP of the UE; determine that the UE is blocked from establishing a connection with the RAN node by comparing the CE level of the UE to the at least one CE level; and refrain from attempting to establish a connection with the RAN node.

In example 12, the subject matter of example 11, or any of the examples herein, wherein the system information includes a SystemInformationBlockType14 Information Element (IE) indicating the at least one CE level.

In example 13, the subject matter of example 11, or any of the examples herein, wherein the one or more processors are further controlled to: receive, via the interface to the RF circuitry, a notification that UEs of the at least one CE level are not being blocked from establishing a connection with the RAN node; and cause, via the interface to the RF circuitry, a connection to be established with the RAN node.

In a fourteenth example, a computer-readable medium containing program may include instructions for causing one or more processors, associated with a Mobility Management Entity (MME), to: detect that the MME is overloaded; determine at least one Coverage Enhancement (CE) level of User Equipment (UEs) to bar from connecting with a Radio Access Network (RAN) node; and cause instructions, to be communicated to the RAN node, to block UEs of the at least one CE from establishing connections with the RAN.

In example 15, the subject matter of example 14, or any of the examples herein, wherein the instructions for the RAN node to block UEs of the at least one CE level include instructions to for the RAN node to reject Radio Resource Control (RRC) requests from UEs of the at least one CE level.

In example 16, the subject matter of example 14, or any of the examples herein, wherein the instructions for the RAN node to block UEs of the at least one CE level cause the RAN node to broadcast system information indicating that cell access to the at least one CE level is blocked.

In example 17, the subject matter of example 14, or any of the examples herein, wherein the one or more processors are further to: monitor a load status of the MME; determine that the MME is not overloaded; and notify the RAN node that the UEs of the at least one CE level are not to be blocked from establishing connection with the RAN.

In example 18, the subject matter of example 14, or any of the examples herein, wherein a CE level of a UE is based on a measured Reference Signal Received Power (RSRP) of the UE.

In a nineteenth example, a computer-readable medium containing program may include instructions for causing one or more processors, associated with a Radio Access Network (RAN) node, to: process instructions, received from a Mobility Management Entity (MME), to block UEs of at least one Coverage Enhancement (CE) level from establishing a connection with the RAN node; and cause system information to be broadcasted, via the interface to radio frequency (RF) circuitry, indicating that the at least one CE level is blocked.

In example 20, the subject matter of example 19, or any of the examples herein, wherein the system information includes a SystemInformationBlockType14 Information Element (IE) for enhanced Machine-Type-Communication (eMTC) indicating the at least one CE level.

In example 21, the subject matter of example 19, or any of the examples herein, wherein the system information includes a SystemInformationBlockType14-NB Information Element (IE) for Narrowband Internet-of-Things (NB-IoT) devices indicating the at least one CE level.

In example 22, the subject matter of example 19, or any of the examples herein, wherein the at least one CE level includes all CE levels that UEs may use to communicate with the RAN node.

In example 23, the subject matter of example 19, or any of the examples herein, wherein the one or more processors are further to: process instructions from the MME to discontinue blocking UEs of the at least one CE level; and update the system information broadcasted by the RAN node to indicate that the UEs of the at least one CE level are no longer being blocked by the RAN node.

In a twenty-fourth example, a computer-readable medium containing program may include instructions for causing one or more processors, associated with a User Equipment (UE), to: receive, via the interface to the RF circuitry, system information, from a Radio Access Network (RAN) node, that UEs of at least one CE level are being blocked from establishing a connection with the RAN node; determine a measured Reference Signal Received Power (RSRP) of the UE; determine a CE level of the UE based on the measured RSRP of the UE; determine that the UE is blocked from establishing a connection with the RAN node by comparing the CE level of the UE to the at least one CE level; and refrain from attempting to establish a connection with the RAN node.

In example 25, the subject matter of example 24, or any of the examples herein, wherein the system information includes a SystemInformationBlockType14 Information Element (IE) indicating the at least one CE level.

In example 26, the subject matter of example 24, or any of the examples herein, wherein the one or more processors are further controlled to: receive a notification that UEs of the at least one CE level are not being blocked from establishing a connection with the RAN node; and cause a connection to be established with the RAN node.

In a twenty-seventh example, an apparatus of a Mobility Management Entity (MME), may comprise: means for detecting that the MME is overloaded; means for determining means for at least one Coverage Enhancement (CE) level of User Equipment (UEs) to bar from connecting with a Radio Access Network (RAN) node; and means for causing instructions, to be communicated to the RAN node, to block UEs of the at least one CE from establishing connections with the RAN.

In example 28, the subject matter of example 27, or any of the examples herein, wherein the instructions for the RAN node to block UEs of the at least one CE level include instructions to for the RAN node to reject Radio Resource Control (RRC) requests from UEs of the at least one CE level.

In example 29, the subject matter of example 27, or any of the examples herein, wherein the instructions for the RAN node to block UEs of the at least one CE level cause the RAN node to broadcast system information indicating that cell access to the at least one CE level is blocked.

In example 30, the subject matter of example 27, or any of the examples herein, further comprising: means for monitoring a load status of the MME; means for determining that the MME is not overloaded; and means for notifying the RAN node that the UEs of the at least one CE level are not to be blocked from establishing connection with the RAN In example 31, the subject matter of example 27, or any of the examples herein, wherein a CE level of a UE is based on a measured Reference Signal Received Power (RSRP) of the UE.

In a thirty-second example, method, performed by an apparatus of an Mobility Management Entity (MME), may comprise: detecting that the MME is overloaded; determining means for at least one Coverage Enhancement (CE) level of User Equipment (UEs) to bar from connecting with a Radio Access Network (RAN) node; and causing instructions, to be communicated to the RAN node, to block UEs of the at least one CE from establishing connections with the RAN.

In example 33, the subject matter of example 1, or any of the examples herein, wherein the instructions for the RAN node to block UEs of the at least one CE level include instructions to for the RAN node to reject Radio Resource Control (RRC) requests from UEs of the at least one CE level.

In example 34, the subject matter of example 32, or any of the examples herein, wherein the instructions for the RAN node to block UEs of the at least one CE level cause the RAN node to broadcast system information indicating that cell access to the at least one CE level is blocked.

In example 35, the subject matter of example 33, or any of the examples herein, further comprising: monitoring a load status of the MME; determining that the MME is not overloaded; and notifying the RAN node that the UEs of the at least one CE level are not to be blocked from establishing connection with the RAN.

In example 36, the subject matter of example 34, or any of the examples herein, wherein a CE level of a UE is based on a measured Reference Signal Received Power (RSRP) of the UE.

In the preceding specification, various embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

For example, while series of signals and/or operations have been described with regard to FIGS. 2, 4, and 5 the order of the signals/operations may be modified in other implementations. Further, non-dependent signals may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to be limiting. In fact, many of these features may be combined in ways not specifically recited in the claims and/or disclosed in the specification.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used.

What is claimed is:

1. An apparatus of a Mobility Management Entity (MME), comprising:
    one or more processors configured to execute one or more instructions to:
        detect that the MME is overloaded;
        determine at least one Coverage Enhancement (CE) level of a User Equipment (UE) to bar from connecting with a Radio Access Network (RAN) node; and
        cause instructions, to be communicated to the RAN node, to block UEs of the at least one CE level from establishing connections with the RAN node.

2. The apparatus of claim 1, wherein the instructions for the RAN node to block the UEs of the at least one CE level include instructions for the RAN node to reject Radio Resource Control (RRC) requests from the UEs of the at least one CE level.

3. The apparatus of claim 1, wherein the instructions for the RAN node to block the UEs of the at least one CE level cause the RAN node to broadcast system information indicating that cell access to the at least one CE level is blocked.

4. The apparatus of claim 1, wherein the one or more processors are further to:
    monitor a load status of the MME;
    determine that the MME is not overloaded; and
    notify the RAN node that the UEs of the at least one CE level are not to be blocked from establishing the connections with the RAN node.

5. The apparatus of claim 1, wherein the at least one CE level of the UE is based on a measured Reference Signal Received Power (RSRP) of the UE.

6. An apparatus of a Radio Access Network (RAN) node, comprising:
    an interface to radio frequency (RF) circuitry; and
    one or more processors that are controlled to:
        process instructions, received from a Mobility Management Entity (MME), to block UEs of at least one Coverage Enhancement (CE) level from establishing a connection with the RAN node; and
        cause system information to be broadcasted, via the interface to the radio frequency (RF) circuitry, indicating that the at least one CE level is blocked.

7. The apparatus of claim 6, wherein the system information includes a System InformationBlockType14 Information Element (IE) for enhanced Machine-Type-Communication (eMTC) indicating the at least one CE level.

8. The apparatus of claim 6, wherein the system information includes a System InformationBlockType14-NB Information Element (IE) for Narrowband Internet-of-Things (NB-IoT) devices indicating the at least one CE level.

9. The apparatus of claim 6, wherein the at least one CE level includes all CE levels that UEs may use to communicate with the RAN node.

10. The apparatus of claim 6, wherein the one or more processors are further to:
    process instructions from the MME to discontinue blocking UEs of the at least one CE level; and
    update the system information broadcasted by the RAN node to indicate that the UEs of the at least one CE level are no longer being blocked by the RAN node.

11. An apparatus of a User Equipment (UE), comprising:
an interface to radio frequency (RF) circuitry; and
one or more processors that are controlled to:
receive, via the interface to the RF circuitry, system information, from a Radio Access Network (RAN) node, that notifies that UEs of one or more Coverage Enhancement (CE) levels are to be blocked from establishing a connection with the RAN node by indicating the one or more CE levels to be blocked;
determine a CE level of the UE;
determine that the UE is blocked from establishing the connection with the RAN node by comparing the CE level of the UE to the one or more CE levels; and
refrain from attempting to establish the connection with the RAN node;
wherein the system information further includes a duration during which the one or more CE levels are to be blocked.

12. The apparatus of claim 11, wherein the system information includes a SystemInformationBlockType14 Information Element (IE) indicating the one or more CE levels.

13. The apparatus of claim 11, wherein the one or more processors are further controlled to:
receive, via the interface to the RF circuitry, a notification that the system information has changed; and
cause, via the interface to the RF circuitry, to receive an updated system information, in response to receiving the notification.

14. The apparatus of claim 11, wherein the one or more processors are further controlled to determine a measured Reference Signal Received Power (RSRP) of the UE and determine the CE level of the UE based on the measured RSRP of the UE.

15. A non-transitory computer-readable medium containing program instructions for causing one or more processors, associated with a Mobility Management Entity (MME), to:
detect that the MME is overloaded;
determine at least one Coverage Enhancement (CE) level of a User Equipment (UE) to bar from connecting with a Radio Access Network (RAN) node; and
cause instructions, to be communicated to the RAN node, to block UEs of the at least one CE level from establishing connections with the RAN node.

16. The non-transitory computer-readable medium of claim 15, wherein the instructions for the RAN node to block the UEs of the at least one CE level include instructions for the RAN node to reject Radio Resource Control (RRC) requests from the UEs of the at least one CE level.

17. The non-transitory computer-readable medium of claim 15, wherein the instructions for the RAN node to block the UEs of the at least one CE level cause the RAN node to broadcast system information indicating that cell access to the at least one CE level is blocked.

18. The non-transitory computer-readable medium of claim 15, wherein the one or more processors are further to:
monitor a load status of the MME;
determine that the MME is not overloaded; and
notify the RAN node that the UEs of the at least one CE level are not to be blocked from establishing the connections with the RAN node.

19. The non-transitory computer-readable medium of claim 15, wherein the at least one CE level of the UE is based on a measured Reference Signal Received Power (RSRP) of the UE.

20. A non-transitory computer-readable medium containing program instructions for causing one or more processors, associated with a Radio Access Network (RAN) node, to:
process instructions, received from a Mobility Management Entity (MME), to block UEs of at least one Coverage Enhancement (CE) level from establishing a connection with the RAN node; and
cause system information to be broadcasted, via an interface to radio frequency (RF) circuitry, indicating that the at least one CE level is blocked.

21. The non-transitory computer-readable medium claim 20, wherein the system information includes a SystemInformationBlockType14 Information Element (IE) for enhanced Machine-Type-Communication (eMTC) indicating the at least one CE level.

22. The non-transitory computer-readable medium claim 20, wherein the system information includes a SystemInformationBlockType14-NB Information Element (IE) for Narrowband Internet-of-Things (NB-IoT) devices indicating the at least one CE level.

23. The non-transitory computer-readable medium of claim 20, wherein the at least one CE level includes all CE levels that UEs may use to communicate with the RAN node.

24. The non-transitory computer-readable medium of claim 20, wherein the one or more processors are further to:
process instructions from the MME to discontinue blocking UEs of the at least one CE level; and
update the system information broadcasted by the RAN node to indicate that the UEs of the at least one CE level are no longer being blocked by the RAN node.

* * * * *

UNITED STATES PATENT AND TRADEMARK OFFICE
CERTIFICATE OF CORRECTION

PATENT NO. : 11,290,943 B2
APPLICATION NO. : 16/609312
DATED : March 29, 2022
INVENTOR(S) : Meghashree Dattatri Kedalagudde et al.

It is certified that error appears in the above-identified patent and that said Letters Patent is hereby corrected as shown below:

In the Claims

In Claim 21, Column 36, Line 27: Insert the word --of-- between "medium" and "claim"

In Claim 22, Column 36, Line 32: Insert the word --of-- between "medium" and "claim"

Signed and Sealed this
Sixth Day of September, 2022

Katherine Kelly Vidal
*Director of the United States Patent and Trademark Office*